United States Patent [19]

Kishi et al.

[11] Patent Number: 5,485,448
[45] Date of Patent: Jan. 16, 1996

[54] OPTICAL DISK MASTERING APPARATUS HAVING TWO DATA TRANSFERRING RATES FOR RECORDING AND MONITORING

[75] Inventors: Yoshio Kishi; Teruhito Noshiro; Masato Noguchi, all of Kanagawa; Hiroaki Takahashi, Tokyo, all of Japan

[73] Assignee: Sony Corporation, Japan

[21] Appl. No.: 209,111

[22] Filed: Mar. 8, 1994

[30]    Foreign Application Priority Data

Mar. 9, 1993  [JP]  Japan .................................. 5-048399

[51] Int. Cl.⁶ .............................. G11B 19/02; G11B 7/28
[52] U.S. Cl. ................... 369/99; 369/54; 369/85; 369/84
[58] Field of Search .................... 369/99, 84, 85, 369/275.1, 54, 48, 32; 360/15

[56]            References Cited

U.S. PATENT DOCUMENTS 5,353,276  10/1994  Schröder ........................... 369/275.1
5,365,381  11/1994  Scheffler ................................. 369/84
5,375,017  12/1994  Kawai et al. ........................... 360/15
5,412,628   5/1995  Yamazaki et al. ....................... 369/54

*Primary Examiner*—Georgia Y. Epps
*Assistant Examiner*—Kim-Kwok Chu
*Attorney, Agent, or Firm*—Limbach & Limbach

[57]            ABSTRACT

A disk recording and reproducing apparatus which realizes a simultaneous monitoring function with a recording function with a simple pickup system is disclosed. The apparatus comprises a recording and reproducing head, a first memory for receiving and storing input signals at a first rate and supplying the stored signals at a second rate higher than the first rate so as to be recorded onto the disk medium at the second rate by means of the recording and reproducing head, a second memory for receiving and storing signals reproduced at the second rate by means of the recording and reproducing head and outputting the stored signals at a rate lower than the second rate, and a controller for controlling the recording and reproducing head to relatively scan a same portion of the disk medium twice for a predetermined period of time so that recording and reproduction occur alternately and successively at the portion of the disk medium for each predetermined number of blocks.

19 Claims, 36 Drawing Sheets

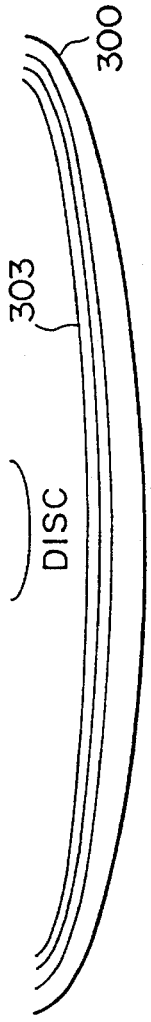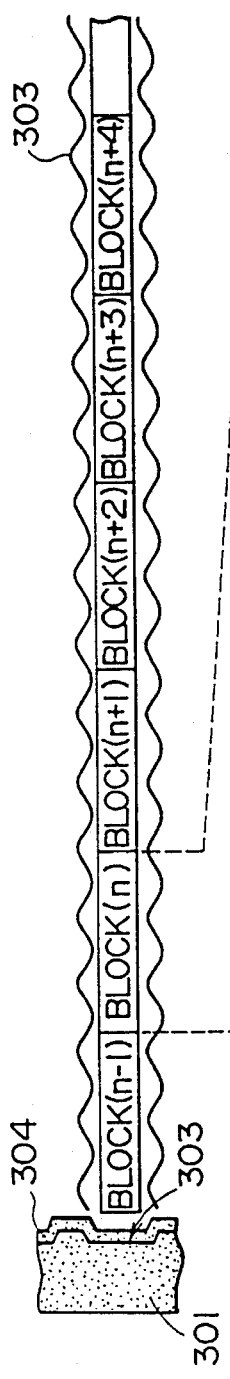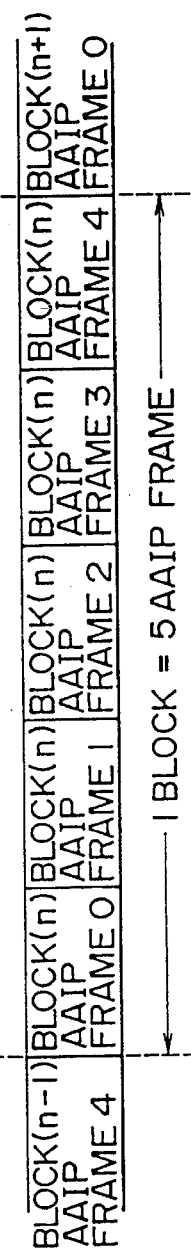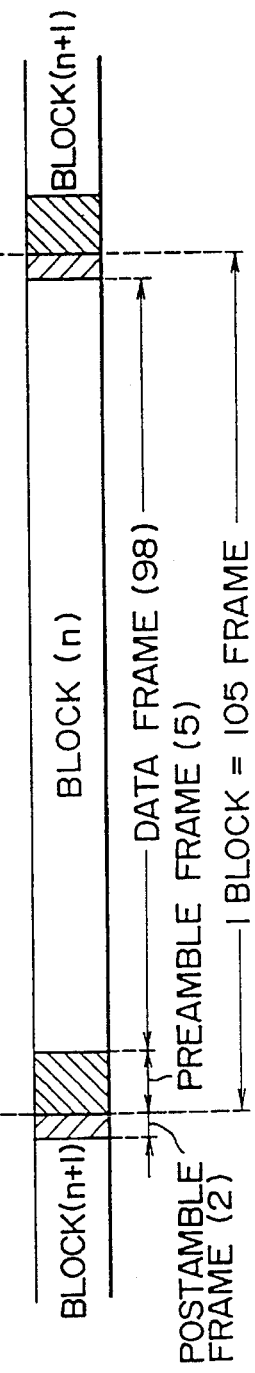
FIG. 5A
FIG. 5B
FIG. 5C
FIG. 5D

FIG. 11

(1) RECORDING CONTROL INFORMATION

- DISK CONTROL INFORMATION
  DISK IDENTIFICATION CODE (DISK ID)
  RECORDING METHOD
  SAMPLING FREQUENCY ETC.
- DATA CONTROL INFORMATION
  ADDRESS TABLE FOR USED SUB AREAS
- RECORDING STATE CONTROL INFORMATION
  START / STOP ADDRESS
  MARK POSITION INFORMATION

MARK POSITION INFORMATION ETC.

(2) SUB CODE DATA AREA

- COMPACT DISK SUB CODE DATA
- MINI DISK SUB CODE DATA (3) EDITION DATA

- FILE CONTROL INFORMATION
- EDITION FILE
  MUSIC LIST
  MUSIC TITLE ETC.
- TAKE LIST ETC.

(4) WAVEFORM DATA
  WAVEFORM ABSOLUTE VALUE DATA ETC.

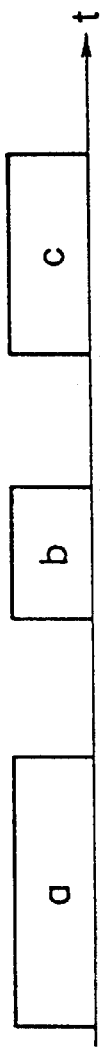
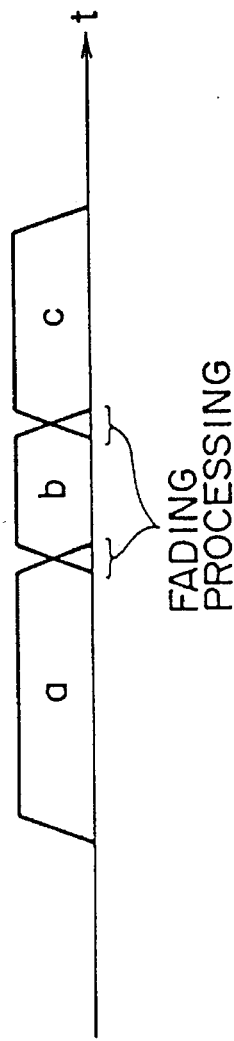
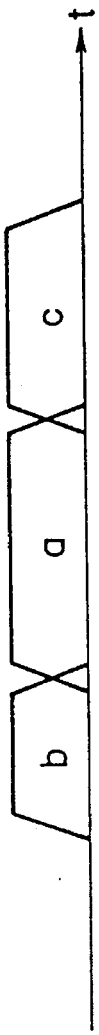
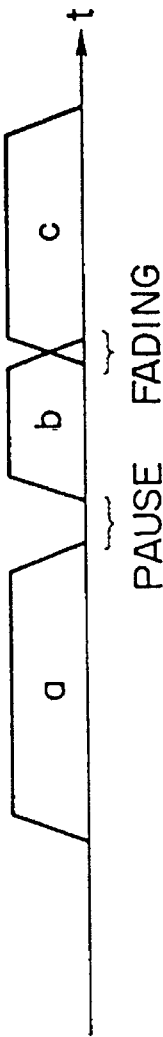
FIG. 13A
FIG. 13B
FIG. 13C
FIG. 13D

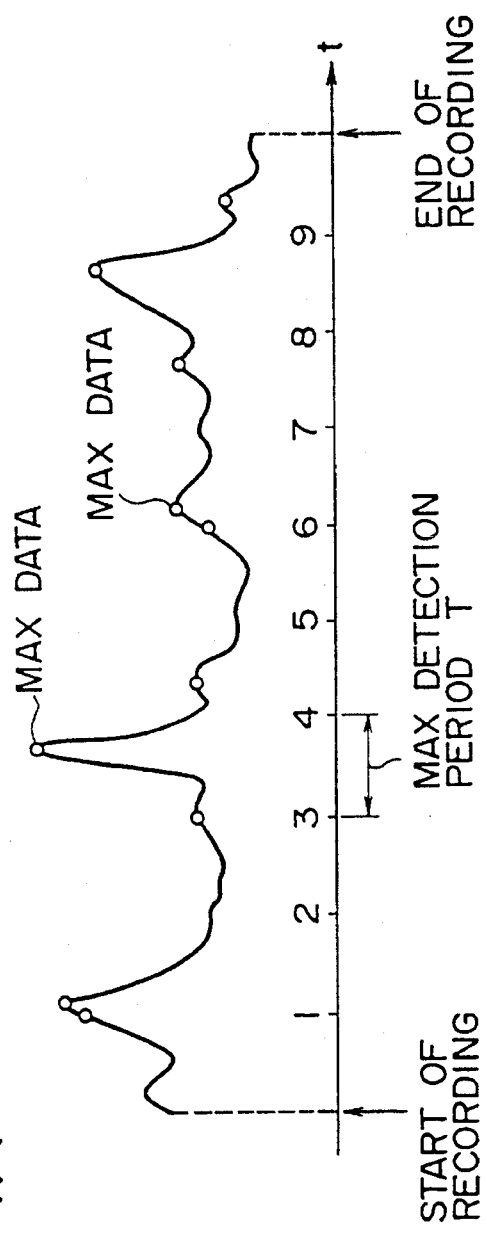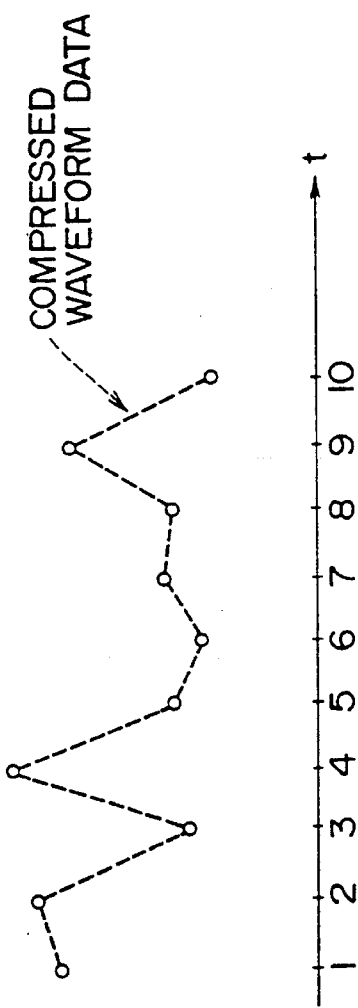
FIG. 14A
FIG. 14B

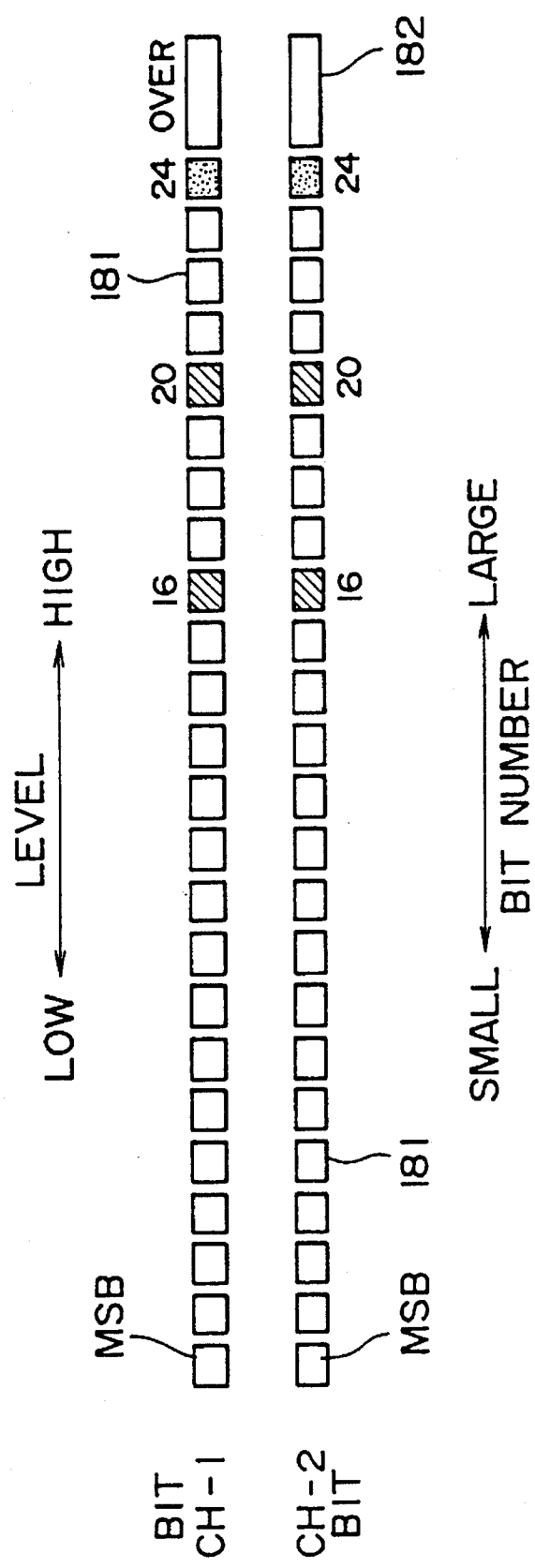

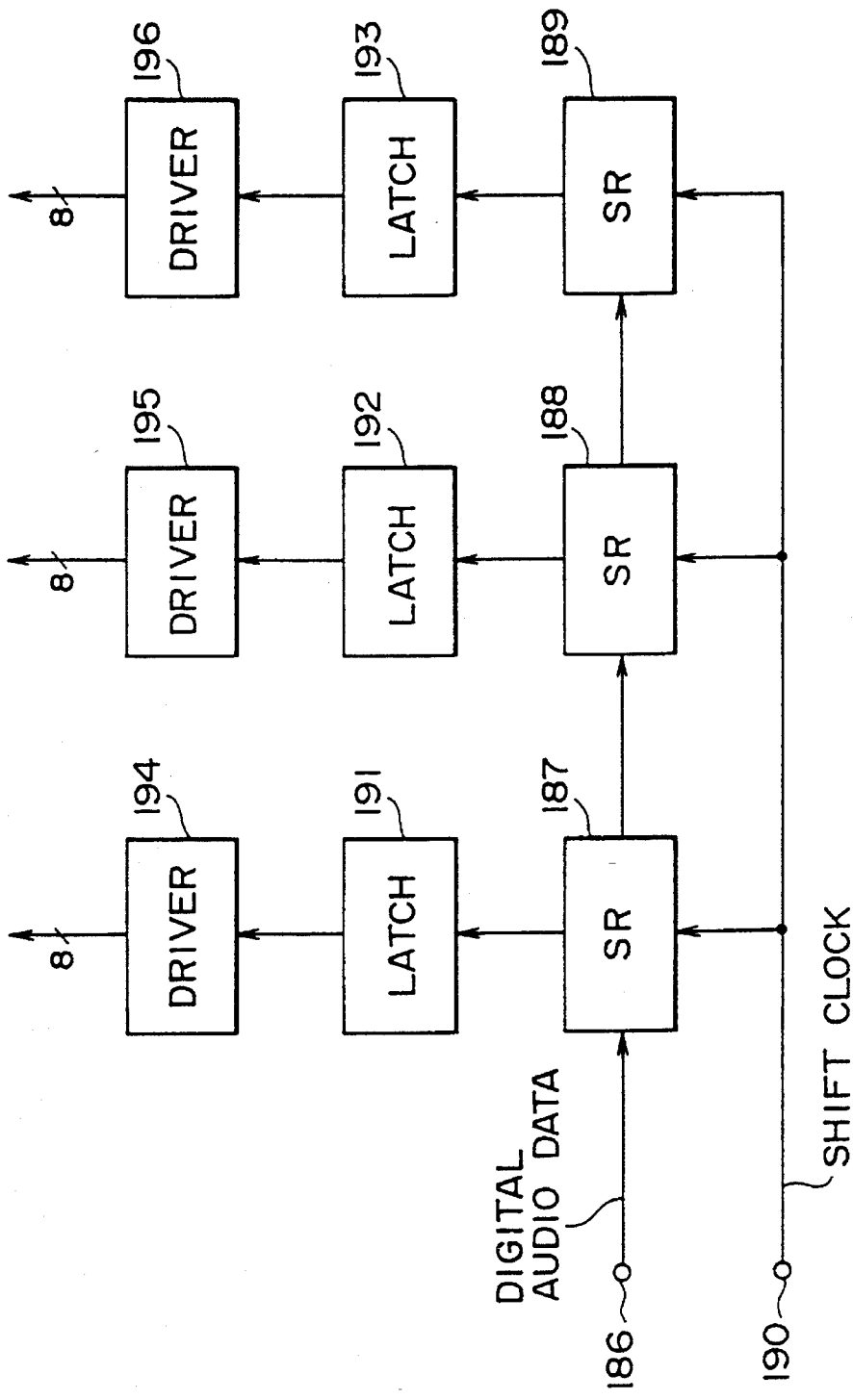

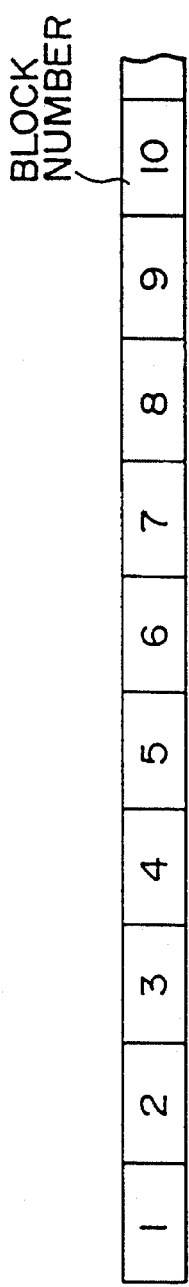
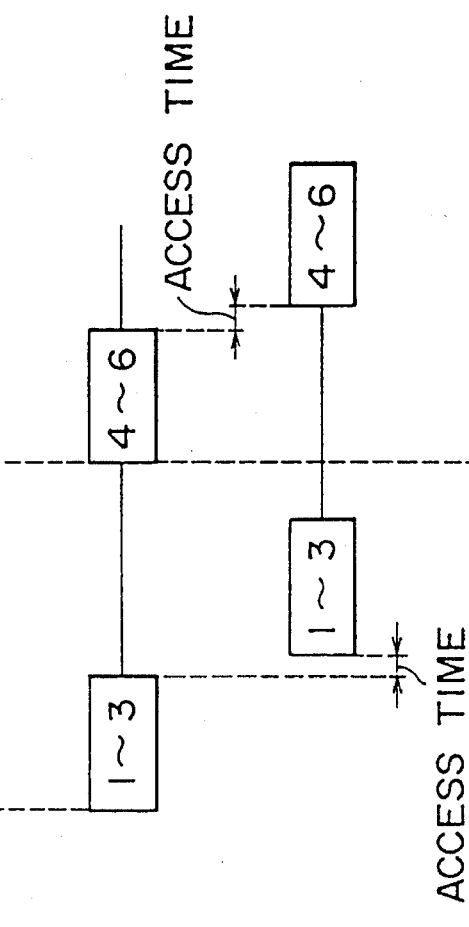
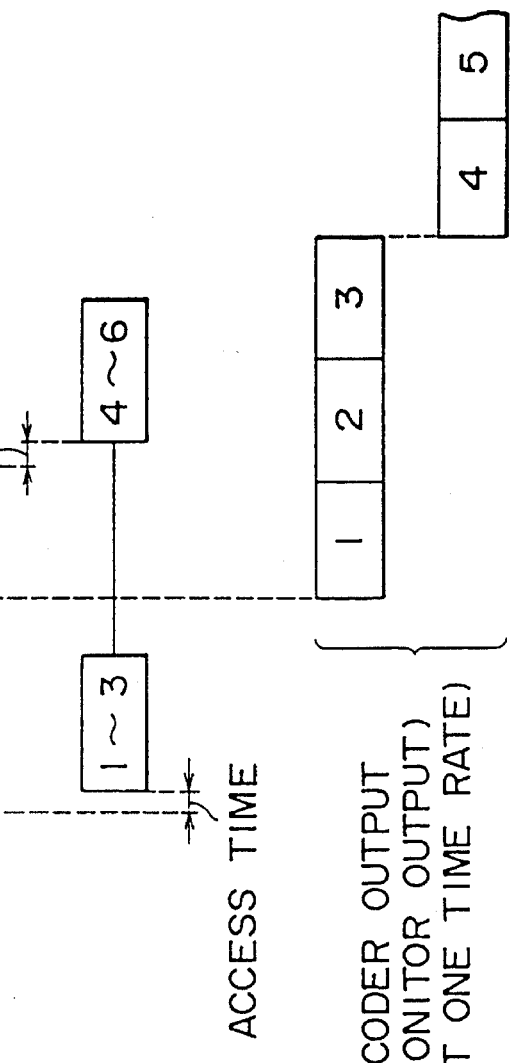
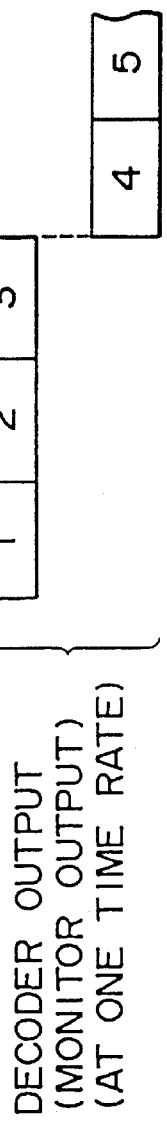
F I G. 18A
F I G. 18B
F I G. 18C
F I G. 18D

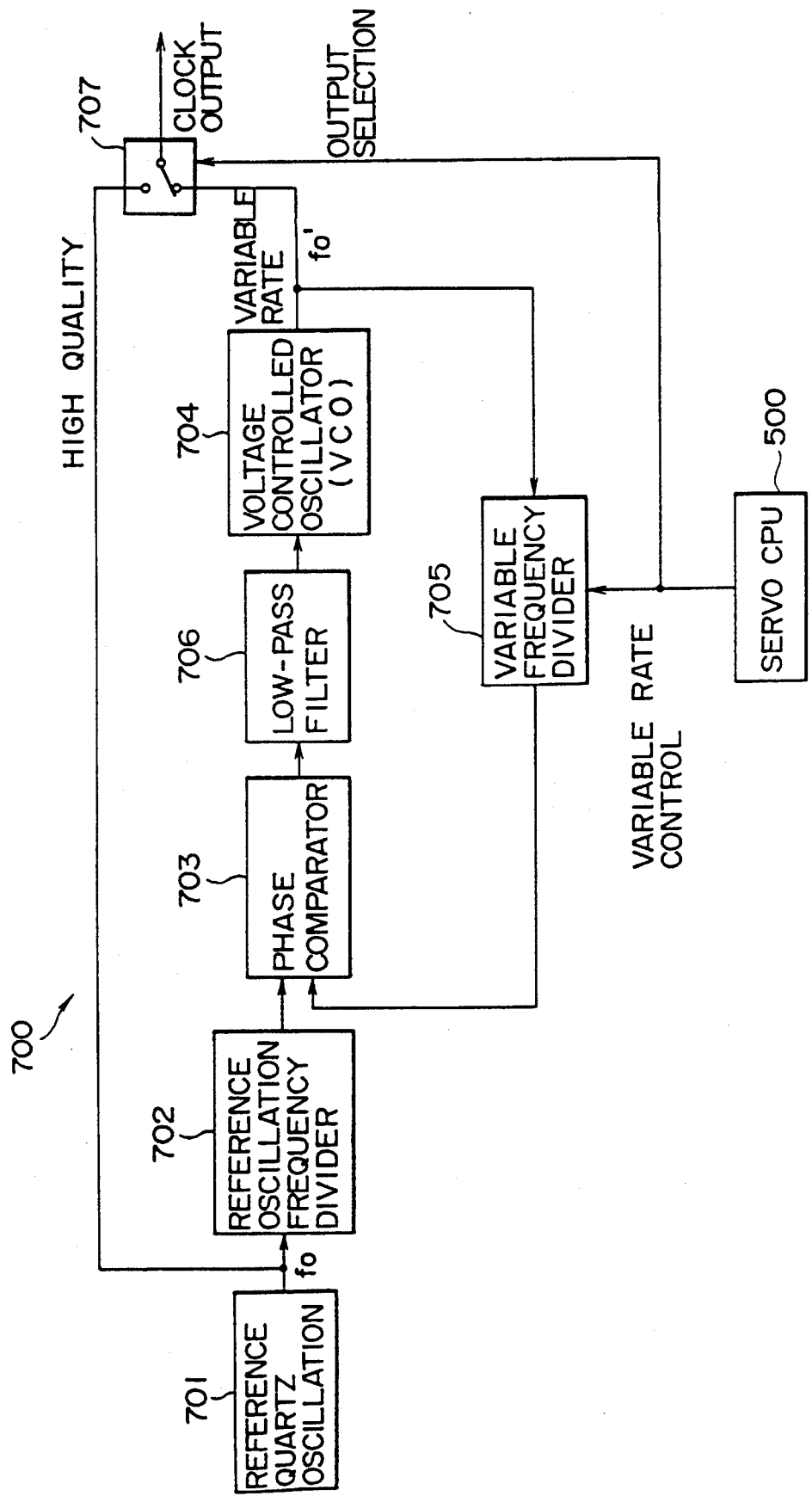

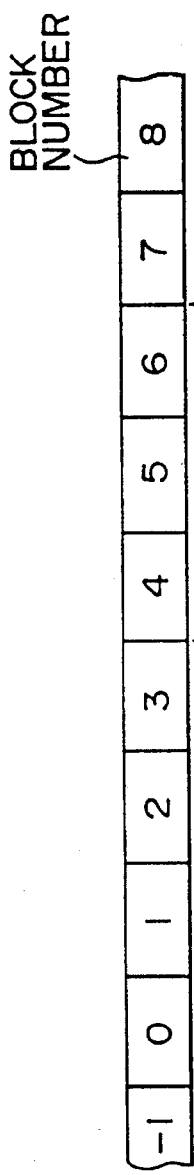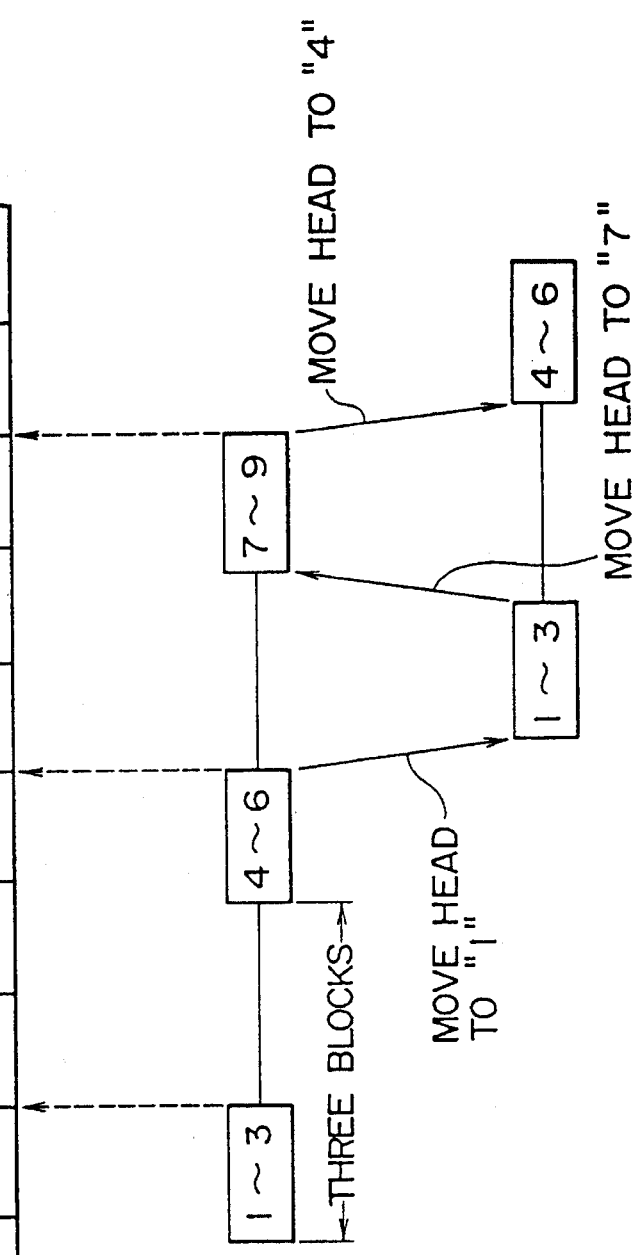
F I G. 22A
F I G. 22B
F I G. 22C

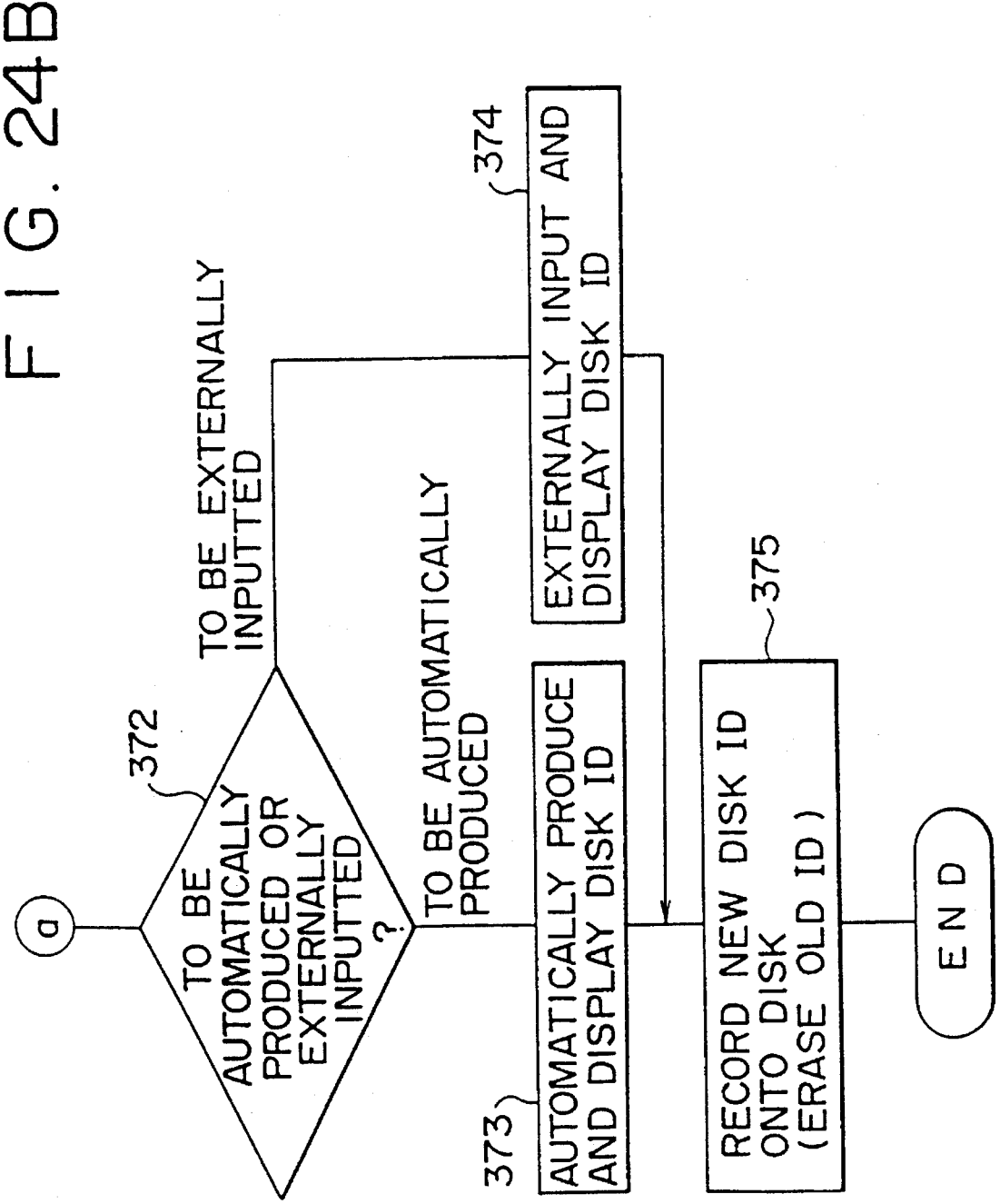

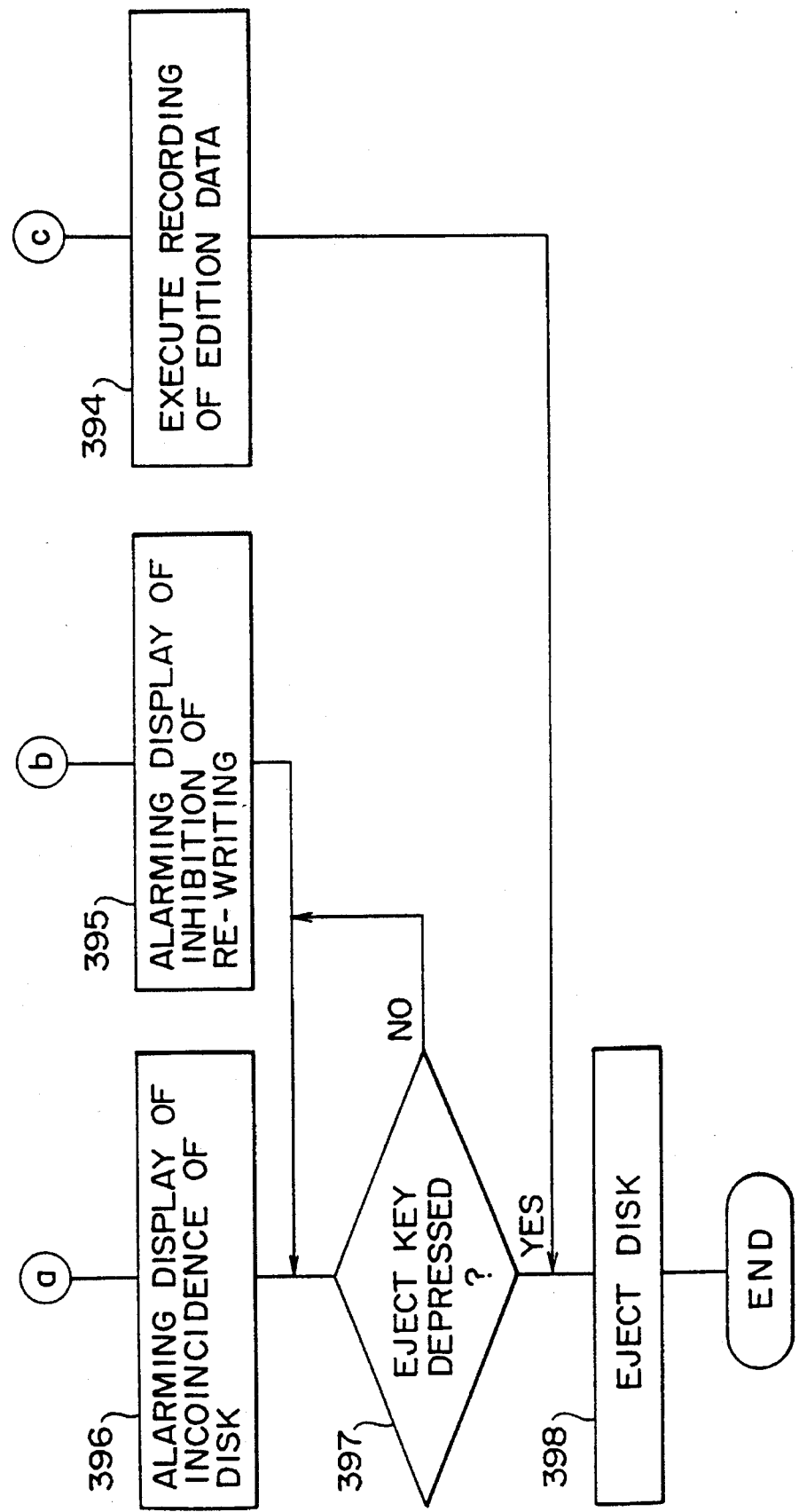

BLKWD

| 16 BIT | 20 BIT | 24 BIT |
|--------|--------|--------|
| 1470   | 1176   | 980    |

FIG. 29

TCWD

| SAMPLING FREQ. | TC FORMAT | | | |
|---|---|---|---|---|
| | SMPTE 30 Hz | SMPTE 29.97Hz | EBU 25 Hz | FILM 24 Hz |
| 48KHz | 1600 | 1601.6 | 1920 | 2000 |
| 44.1KHz | 1470 | 1471.47 | 1764 | 1837.5 |
| 44.056KHz | 1468.531 | 1470 | 1762.238 | 1835.664 |

FIG. 33

| EDITION POINT | START POINT | END POINT |
|---|---|---|
| E 1 | I 1 | O 1 |
| E 2 | I 2 | O 2 |
| E 3 | I 3 | O 3 |
| E 4 | I 4 | O 4 |
| E 5 | I 5 | O 5 |
| E 6 | I 6 | O 6 |
| . | . | . |
| . | . | . |
| . | . | . |

E ➡

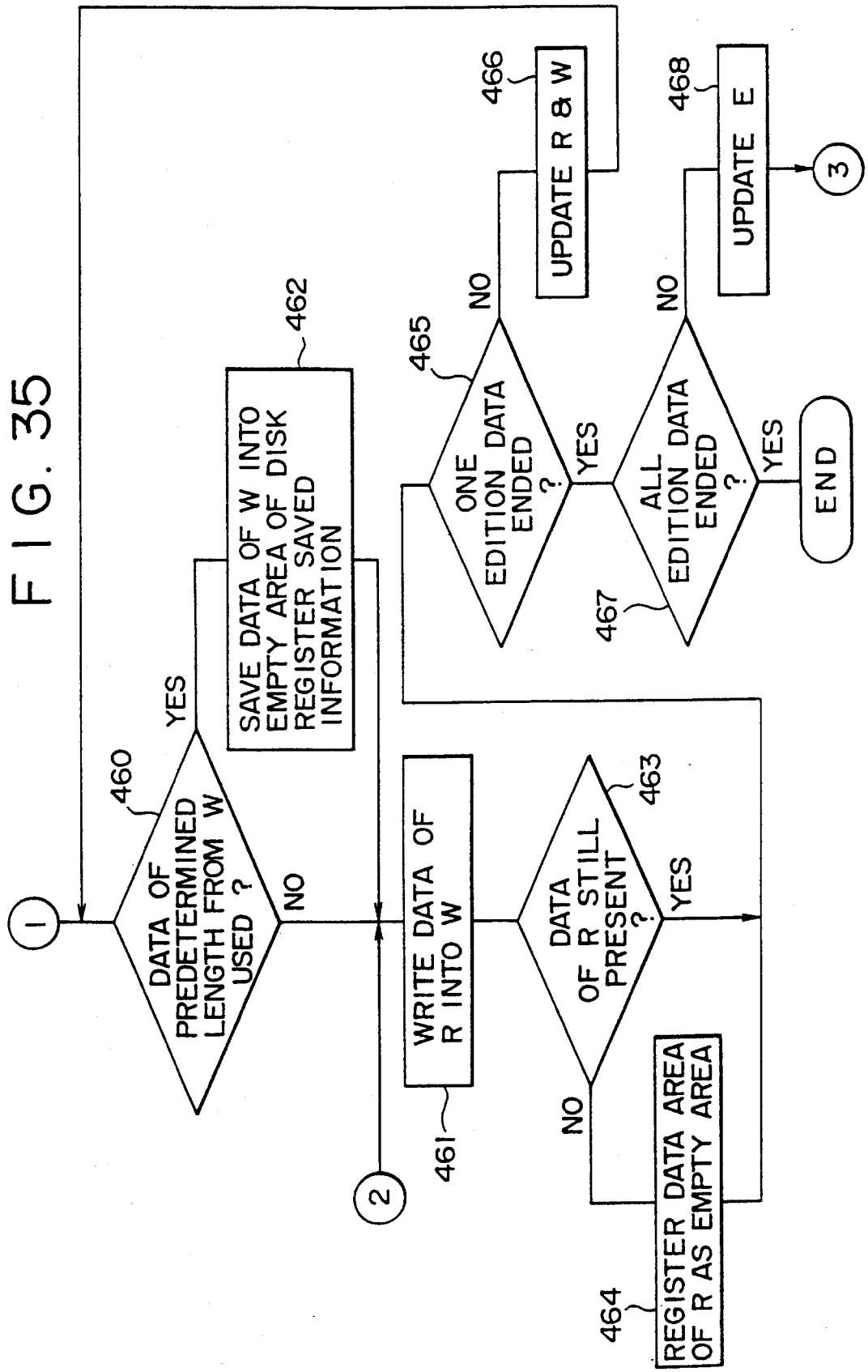

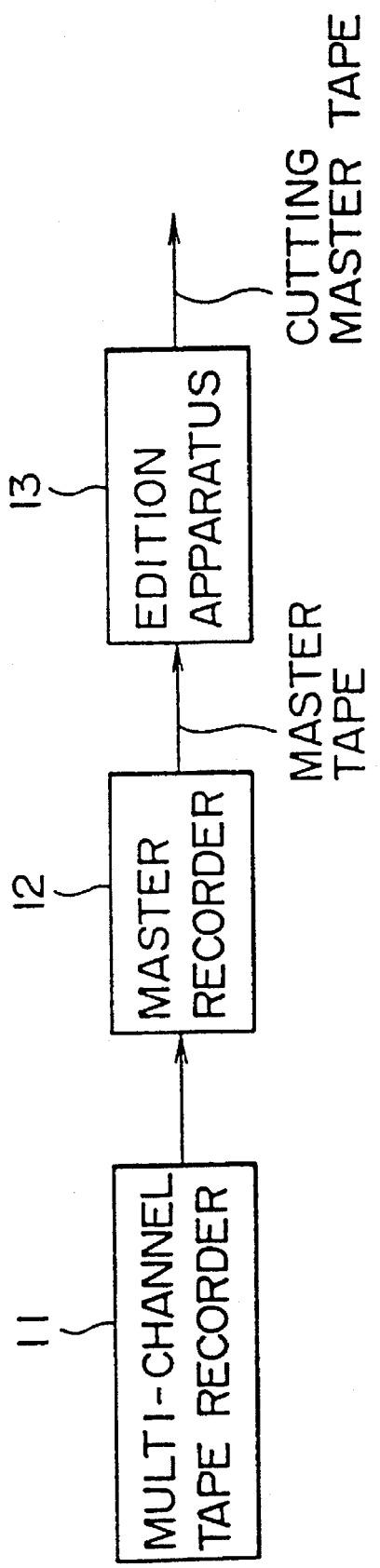

OPTICAL DISK MASTERING APPARATUS HAVING TWO DATA TRANSFERRING RATES FOR RECORDING AND MONITORING

BACKGROUND OF THE INVENTION

1. Field of the Invention

This invention relates to a disk recording and reproducing apparatus in which recording monitoring (simultaneous recording and monitoring) can be performed with a single pickup system, and more particularly to a disk recording and reproducing apparatus suitably applied to a master recording apparatus for producing a cutting master disk which is an original disk to be used to manufacture a large number of compact disks (CDs) or mini disks (MDs) in a musical disk manufacturing factory.

2. Description of the Related Art

When it is tried to manufacture a large number of compact disks or mini disks in a musical disk manufacturing factory, a recording medium for a cutting master which is an original for such compact disks or mini disks must be prepared. Normally, a magnetic tape is used as the recording medium. FIG. 36 shows an outline of a conventional master recording apparatus which is used to produce an original.

Referring to FIG. 36, the master recording apparatus 10 includes a multi-channel tape recorder 11 by which original musical signals are recorded. Normally, a digital video tape recorder (U-matic video tape recorder) is used as the multi-channel tape recorder 11, and an original sound tape on which musical signals are recorded is produced. Musical signals are recorded in a plurality of, for example, 24, channels on the original sound tape, and the musical signals from the original sound tape are converted into 2-channel signals and recorded onto a master tape by means of a master recorder 12.

The master tape is supplied to an editing apparatus 13, on which editing processing necessary for conversion of data into data of a format conforming to a type of a disk to be cut or some other factor is performed to produce a master tape for final cutting. Using the master tape for cutting, corresponding disks such as compact disks or cassette tapes are manufactured in a disk manufacturing factory.

As musical disks have become increasingly popular in recent years, a demand for disks as original recording media is increasing. When a disk is used as an original, original signals can be recorded linearly without compressing the same and can be edited with a single original without destroying the same.

Also when a disk is used as an original rather than a tape, it is convenient if a simultaneous monitoring function is provided when recording musical signals onto the disk.

In order to allow editing of a disk, the disk preferably is a writable or re-writable disk. In order to realize simultaneous monitoring with recording (hereinafter referred to as recording monitoring) where a writable disk is used, a pickup system for recording data onto a disk and another pickup system for monitoring the disk must be provided. However, where the pickup systems are constituted in a multi-beam system in this manner, the construction of the pickup systems and a signal processing system are complicated.

SUMMARY OF THE INVENTION

It is an object of the present invention to provide a disk recording and reproducing apparatus which realizes recording monitoring with a simple pickup system.

In order to attain the object described above, according to an aspect of the present invention, there is provided an apparatus for recording and reproducing signals in data blocks onto and from a disk medium, comprising a recording and reproducing head, first memory means for receiving and storing input signals at a first rate and supplying the stored signals at a second rate higher than the first rate so as to be recorded onto the disk medium at the second rate by means of the recording and reproducing head, second memory means for receiving and storing signals reproduced at the second rate by means of the recording and reproducing head and outputting the stored signals at a rate lower than the second rate, and control means for controlling the recording and reproducing head to relatively scan a same portion of the disk medium twice for a predetermined period of time so that recording and reproduction occur alternately and successively at the portion of the disk medium for each predetermined number of blocks.

According to another aspect of the present invention, there is provided a method of recording and reproducing signals onto and from a disk medium, the signals being supplied to and stored into a first memory at a first rate before it is recorded onto the disk medium, comprising the steps of outputting a predetermined number of blocks of the stored signals from the first memory at a second rate higher than the first rate, recording the output signal blocks from the first memory onto the disk medium by means of a recording and reproducing head, moving the recording and reproducing head to a starting position of the disk medium at which the predetermined number of blocks are recorded, reproducing the predetermined number of recorded blocks by means of the recording and reproducing head, storing the reproduced predetermined number of blocks into a second memory at the second rate, repeating all of the steps above until the predetermined number of blocks are stored into the second memory by a plurality of sets, and outputting each of the plurality of sets of the predetermined number of blocks from the second memory at a rate lower than the second rate substantially simultaneously with recording of a following predetermined number of blocks onto the disk medium.

In the apparatus and method of the invention, the rate at which the second memory means outputs the stored signals may be equal to the first rate.

The second rate may be controlled in accordance with a speed of rotation of the disk medium.

Each of the first and second memory means may include a buffer memory of the first-in first-out type.

Preferably, the second rate is set equal to or higher than 2.5 times the first rate.

The recording and reproducing head may include an optical pickup and a magnetic head positioned with the disk medium interposed therebetween.

In the apparatus and method, reading of data from the first memory means and writing of the data onto the disk are performed at the second rate, which is equal to or higher than 2.5 times the first rate at which data are inputted to the first memory means. Also reproduction of the data from the disk medium is performed at the second rate, and the thus reproduced data are written into the second memory means.

Consequently, even if input audio data for three blocks are written onto the disk medium and then reproduced immediately at an equal rate, the reproduction of the written data comes to an end before completion of writing of the input audio data for three blocks. Accordingly, even if an access time of the recording and reproducing head is taken into consideration, if writing and reading of data onto and from the disk medium are performed at the rate higher than 2.5 times the ordinary or first rate, recording monitoring can be realized with a single pickup system, that is, the recording and reproducing head.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIGS. 5A to 5D are diagrams illustrating a relationship between an absolute address and data;

FIG. 11 is a table illustrating recorded contents of a sub data area;

FIGS. 13A to 13D are waveform diagrams illustrating a program reproduction mode;

FIGS. 14A and 14B are waveform diagrams illustrating recording of waveform data and sampling of waveform data, respectively;

FIG. 15 is a diagram illustrating an example of a display of data bits;

FIG. 16 is a block diagram showing a display element driving circuit which realizes a data bit display;

FIGS. 18A to 18D are diagrams illustrating recording monitoring;

FIG. 21 is a block diagram of a variable oscillation circuit which can be used as a clock generating circuit;

FIGS. 22A to 22C are diagrams illustrating synchronous recording;

FIG. 24A and 24B are flow charts illustrating operation for recording a disk ID;

FIGS. 25A and 25B and FIGS. 26A and 26B are flow charts illustrating recording of edition data;

FIG. 27 is a flow chart illustrating conversion of a time code;

FIGS. 28 and 29 are tables illustrating conversion of a time code;

FIG. 33 is a table showing edition data to be used for optimization processing;

FIGS. 34 and 35 are flow charts illustrating optimization processing of recording data; and FIG. 36 is a block diagram of a conventional master recording apparatus.

DETAILED DESCRIPTION OF THE PREFERRED EMBODIMENT

Figure 1:
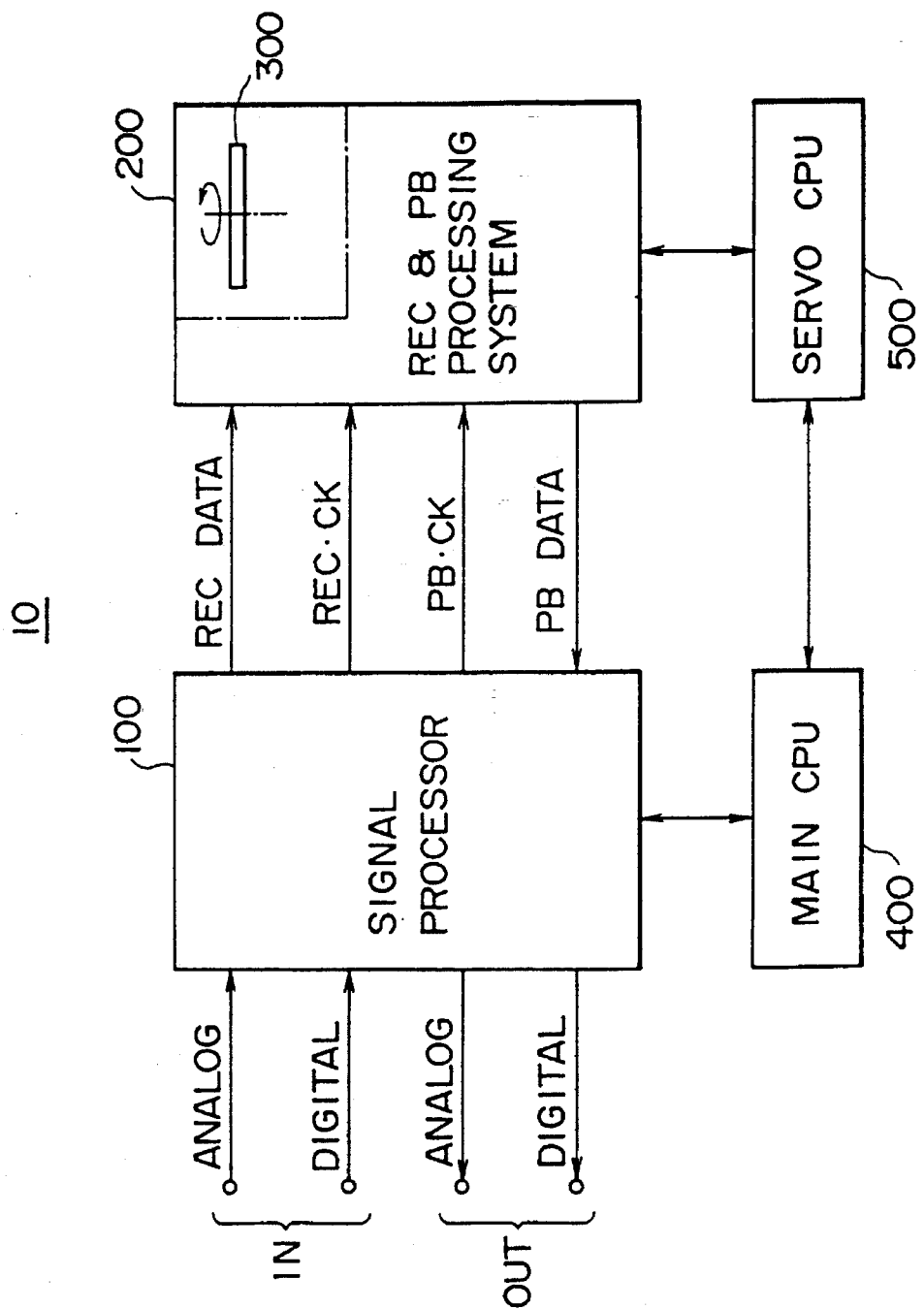
FIG. 1 is a block diagram of a master recording apparatus to which the present invention is applied.

Referring first to FIG. 1, there is shown an outline of a master recording apparatus as a disk recording and reproducing apparatus to which the present invention is applied. The master recording apparatus shown is generally denoted at 10 and includes a signal processor 100 to which an original sound signal is inputted. The original sound signal is processed in accordance with an object by the signal processor 100, and audio data (recording data) from the signal processor 100 are supplied to a recording and reproduction processing system 200 at a next stage and recorded onto a disk 300 provided in the recording and reproduction processing system 200.

The disk 300 is a writable disk and makes an original, that is, a master disk for cutting. The audio data recorded on the disk 300 can be edited without destroying the same. Details of such edition will be hereinafter described.

A main CPU (central processing unit) 400 serving as a main control section controls the signal processor 100 while another CPU 500 serving as another control section controls the recording and reproduction processing system 200. Since the CPU 500 mainly controls a servo system for the disk 300, it will be hereinafter referred to as servo CPU 500. The main CPU 400 and the servo CPU 500 are communicated with each other by way of an SCSI interface so that they may operate in synchronism with each other.

Figure 2:
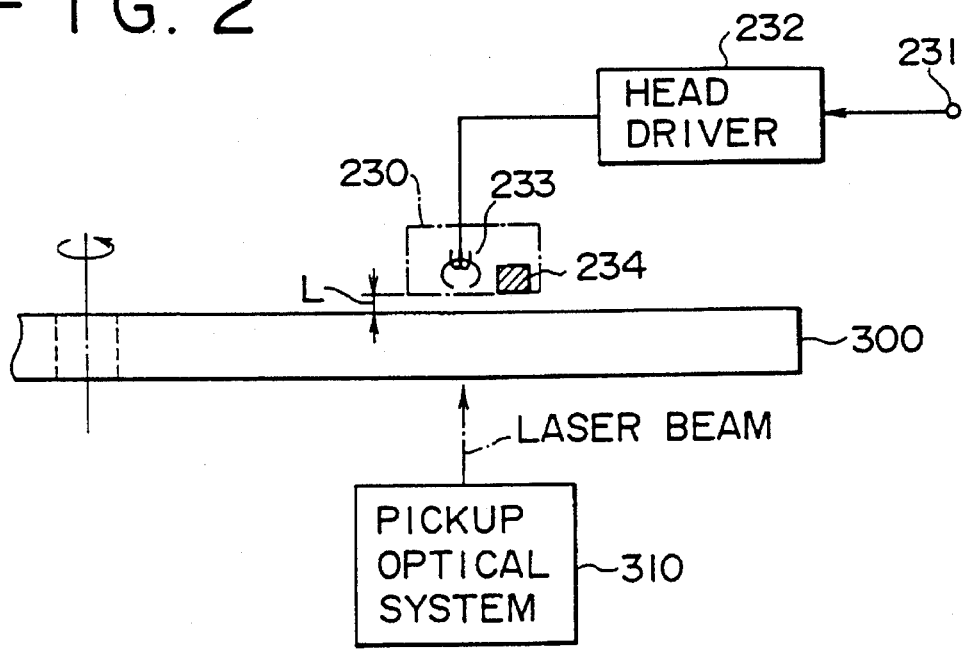
FIG. 2 is a diagrammatic view showing an outline of a pickup system and a head system of the master recording apparatus of FIG. 1.

Referring now to FIG. 2, there is shown an outline of a recording and reproducing system for recording and reproducing audio data onto and from the disk 300. Here, such a magneto-optic disk (MO disk) as will be hereinafter described is used as the disk 300, and an optical pickup apparatus 310 which makes use of a laser beam is disposed adjacent a face of the disk 300 while a magnetic head apparatus 230 constituting a recording system is disposed adjacent the other face of the disk 300 such that the disk 300 is positioned between the optical pickup apparatus 310 and the magnetic head apparatus 230. The writable disk, however, is not limited to such a magneto-optic disk as mentioned above.

Digital audio data including data incidental to such audio data, which will be hereinafter described, are supplied to a terminal 231. The digital audio data are supplied by way of a head driver 232 to a magnetic head 233, which cooperates to the optical pickup apparatus 310 to effect writing of the audio data.

The magnetic head apparatus 230 includes a gap sensor 234 provided for allowing the magnetic head apparatus 230 to scan in a non-contacting condition with the disk 300. The gap sensor 234 has such an electrode construction as to make a pair with the disk 300, and the magnetic head apparatus 230 is controlled in accordance with the variation of the electrostatic capacity between the gap sensor 234 and the disk 300 detected by the gap sensor 234 so that the gap L between the magnetic head apparatus 230 and the disk 300 may be fixed.

Figure 3:
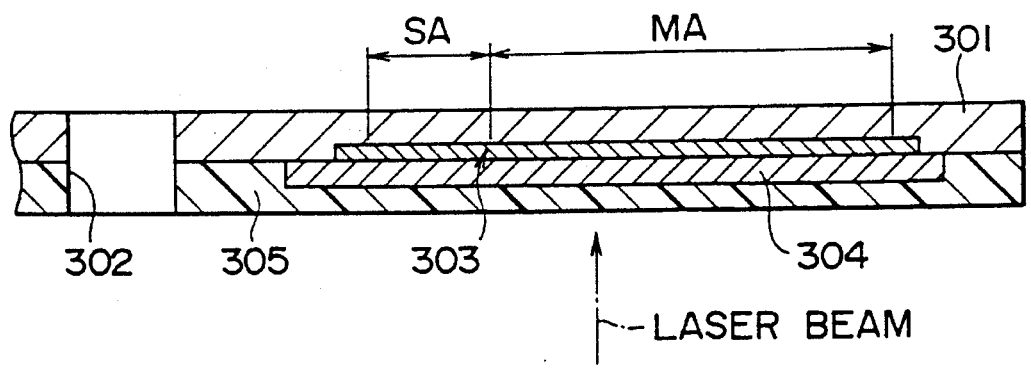
FIG. 3 is a schematic sectional view of a disk.

A disk having such a construction as seen in FIG. 3 is employed as the disk 300.

Figure 4:
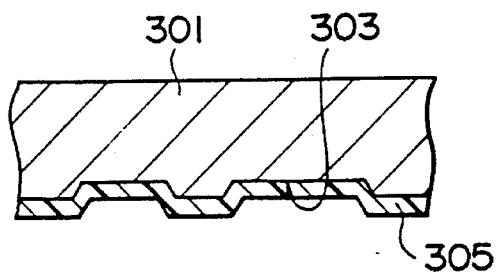
FIG. 4 is an enlarged partial sectional view of the disk shown in FIG. 3.

Referring to FIG. 3, the disk 300 includes a disk base plate 301 in the form of a disk. A pre-groove or guide groove 303 wobbled by FM modulation of an absolute address is formed over a predetermined area at a predetermined position of a lower face of the disk base plate 301 as shown in detail in FIG. 4, and a magneto-optic film or MO film 304 is coated over an area a little greater than the pre-groove 303 on the lower face of the disk base plate 301 in such a manner as to cover over the surface of the pre-groove 303. A chucking hole 302 is formed at the center of the disk base plate 301.

When the magneto-optic film 304 is heated at a particular point thereof to a temperature higher than a predetermined temperature, it is magnetized in the direction of an external magnetic field applied to it is well known in the art. Such heating to a temperature higher than the predetermined temperature is realized by irradiation of a laser beam, and the laser beam is controlled so that the laser power is set higher upon writing of audio data than upon reading. The surface of the magneto-optic film 304 is covered with a protective film 305.

Absolute addresses (AAIP) pre-striped on the pre-groove 303 will be described with reference to FIG. 5. While absolute addresses are recorded in an FM modulated condition on the pre-groove 303, such absolute addresses are recorded in units of a block as seen from FIG. 5B. The absolute addresses are pre-mastered addresses. Same address data are repetitively recorded by five times in a block as seen in FIG. 5C.

Audio data are recorded in blocks each of which has an equal length to that of one block of an absolute address as seen from FIG. 5D, and data of 105 frames are accommodated in one block of audio data. Of the 105 frames, 98 frames are for audio data, and a preamble region for 5 frames is assured at a front portion of the block while a postamble region for 2 frames is assured at a rear portion of the block.

Absolute addresses applied to a main data area MA are recorded so as to increase from the inner circumferential side to the outer circumferential side of the disk 300 while absolute addresses applied to a sub data area SA are recorded so as to increase from the outer circumferential side to the inner circumferential side of the disk 300.

Figure 6:
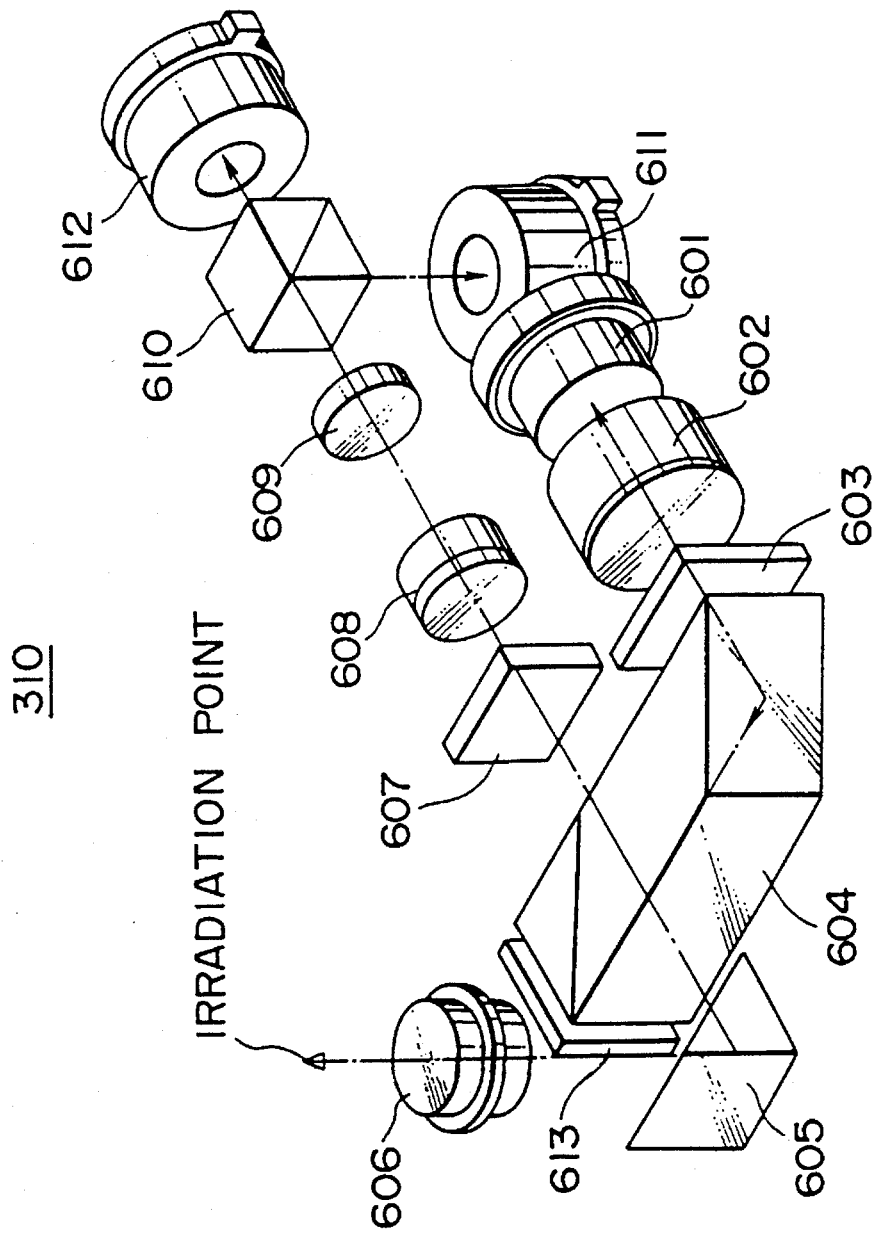
FIG. 6 is a perspective view showing an optical pickup apparatus.

The optical pickup apparatus 310 for reading audio data is constructed in such a manner as shown in FIG. 6. The optical pickup apparatus 310 may be any optical pickup apparatus in use as optical pickup systems for a compact disk or a like disk.

Referring to FIG. 6, laser light, that is, a laser beam, obtained by way of a collimator lens 602 from a laser light source 601 is diffracted by a grating 603 so that it is divided into a plurality of laser beams. In the arrangement shown, the laser beam is divided into at least three beams so that they may be used for reading out a signal, for detection of a tracking error and for focusing control. The laser beams thus divided are irradiated upon the disk 300 by way of a beam splitter 604, a phase mirror 605 and an objective lens 606.

The laser light or return light reflected from the disk 300 is introduced into and passes through the beam splitter 604 and then introduced into a beam splitter 610 by way of a half-wave plate 607, a converging lens 608 and a multi-lens 609. Part of the laser light is reflected by the beam splitter 610 and forms an image on a first light detecting element 611 while the other part of the laser light passes through the beam splitter 610 and forms an image on a second light detecting element 612.

The first and second light detecting elements 611 and 612 may each be constituted from a detecting element having a light detecting face which is divided into a plurality of areas. In this instance, outputs from the areas of the light detecting face of the detecting element are processed by suitable addition and/or subtraction processing to detect audio data (an RF signal), a tracking error or a focusing error.

A photo-detector 613 is provided on an end face of the beam splitter 604 and serves as ATC light amount detecting means for automatically controlling the power of the laser light source 601.

Figure 7:
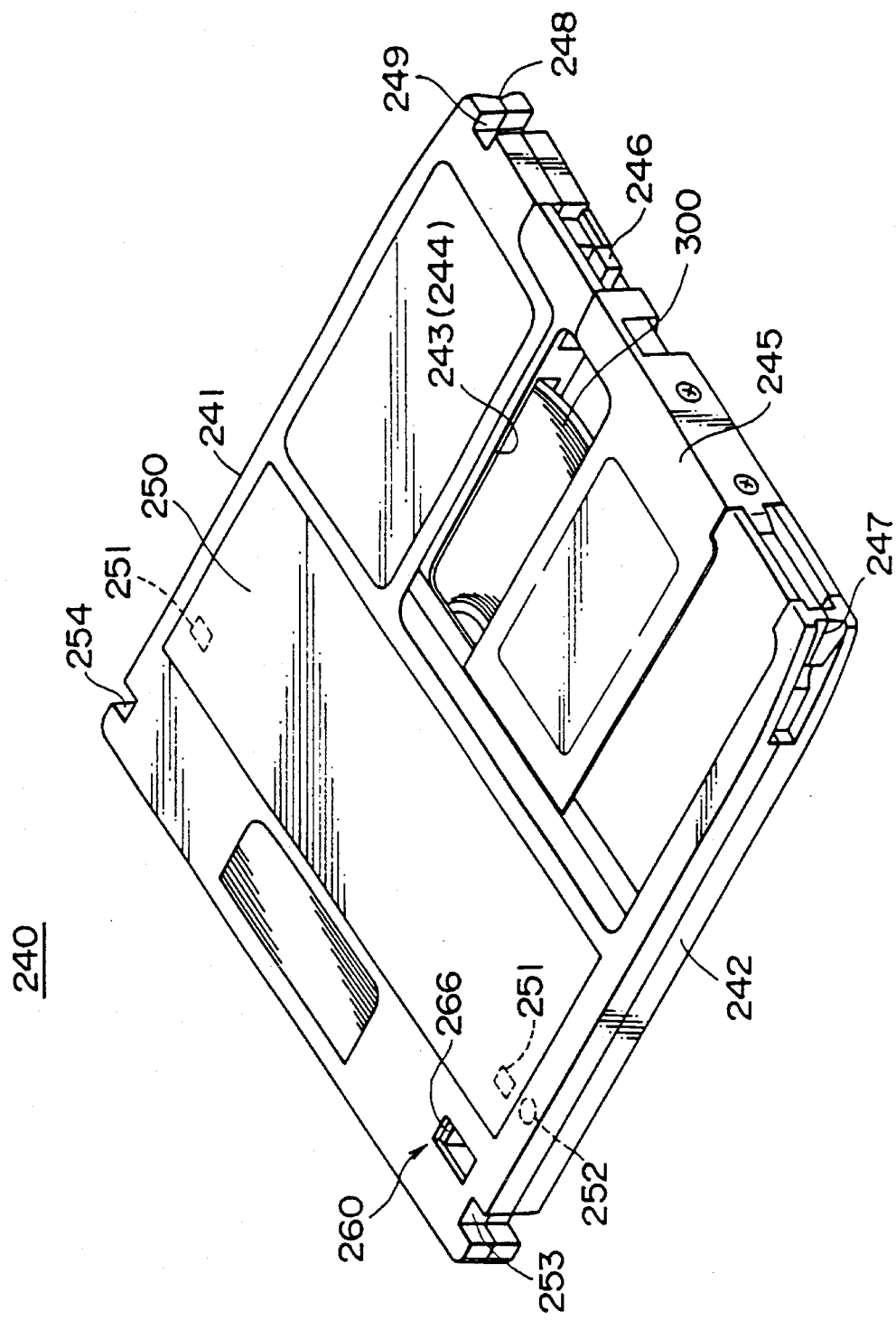
FIG. 7 is a perspective view showing a data accommodating housing.

The writable disk 300 is used in a condition in which it is accommodated in a flattened case or housing similarly to a compact disk or a like disk. FIG. 7 shows an exemplary one of such disk accommodating housings.

Referring to FIG. 7, the disk accommodating housing shown is generally denoted at 240 and includes an upper case 241 and a lower case 242. The disk accommodating housing 240 has a pair of window holes 243 and 244 of a predetermined size formed at predetermined locations of upper and lower walls thereof when the upper case 241 and the lower case 242 are coupled to each other. Normally, a shutter 245 is closed to close the window holes 243 and 244 to protect the disk 300 accommodated in the inside of the disk accommodating housing 240 from dust or some other foreign articles. Upon recording or reproduction of audio data, the shutter 245 is opened as seen in FIG. 7. The shutter 245 is released from its locked condition by an unlocking projection provided on a recessed portion 246 formed on a front wall of the disk accommodating housing 240. Whereas such unlocking takes place when the disk accommodating housing 240 is loaded in position into an apparatus body not shown, since a conventional mechanism is employed for the unlocking function, description thereof is omitted herein.

A pair of grooves 247 and 248 are formed at front portions of the opposite sides of the disk accommodating housing 240 and serve as guide grooves for guidance of the disk accommodating housing 240 upon loading. The grooves 247 and 248 are provided in order to facilitate distinction of the disk 300 of the disk accommodating housing 240 from an MO disk of the 5.25 inch size which is used very frequently for saving of data of a computer. From the point of view of prevention of error insertion, the disk accommodating housing 240 is set to a size a little greater than existing MO disks.

The upper case 241 has a label area 250 on a face thereof. A positioning hole or reference hole 251 for the housing is formed in the lower case 242 while a detection hole 252 for detection of a type of the disk is formed similarly on the lower case 242. It is possible to set the type of a disk corresponding to a type of, for example, a cutting master or corresponding to an attribute such as, for example, whether the disk is for reproduction only or of the type which allows later additional writing only once or else of the writable type.

A pair of recessed grooves 253 and 254 of a predetermined width are formed at rear portions of the opposite sides of the disk accommodating housing 240 and are used as engaging recesses when the disk accommodating housing 240 loaded in position is to be transported to some other location.

Error erasure preventing means 260 is provided at a rear portion of the upper face of the disk accommodating housing 240. A programmable area of the disk 300 described above has a main data area MA and a sub data area SA, into which data can individually be recorded. Therefore, it is required to devise so as to prevent error erasure for both of the areas.

The error erasure preventing means 260 is changed over among three stage positions. At the first stage position, the error erasure preventing means 260 provides a mode in which data can be re-written freely into both of the main data area MA and the sub data area SA. At the second stage position, the error erasure preventing means 260 provides another mode in which data can be re-written only into the sub data area SA. At the third stage position, the error erasure preventing means 260 provides a further mode in which it prevents error erasure for both of the main data area MA and the sub data area SA.

Where the three modes are provided in this manner to achieve prevention of error erasure, data of the programmable area can be protected with certainty in accordance with an object of the user. Such a construction as seen from FIGS. 8 to 10 is employed to achieve such stepwise prevention of error erasure.

Figure 8:
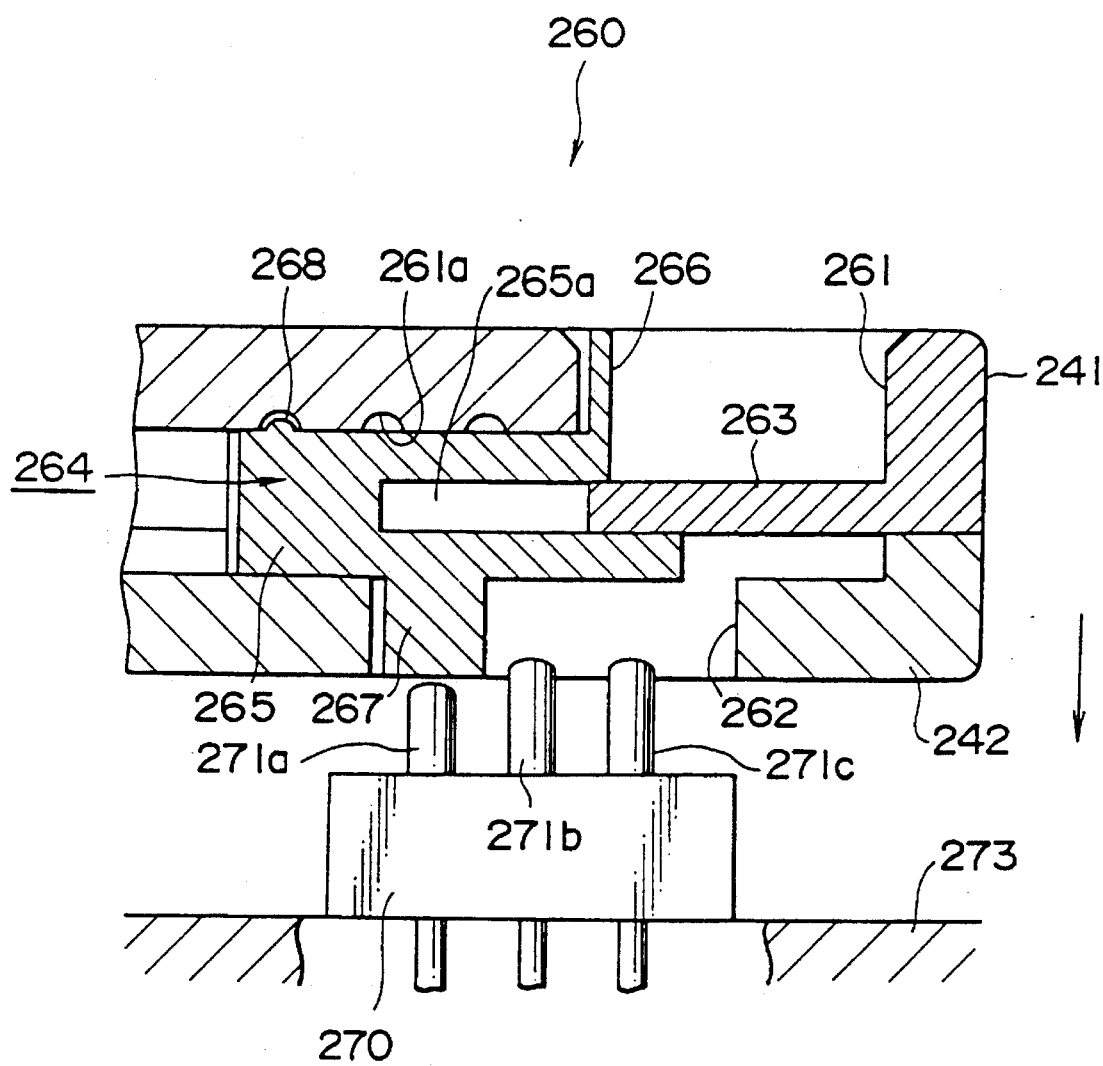
FIG. 8 is an enlarged partial sectional view of error erasure preventing means of the data accommodating housing.
Figure 9:
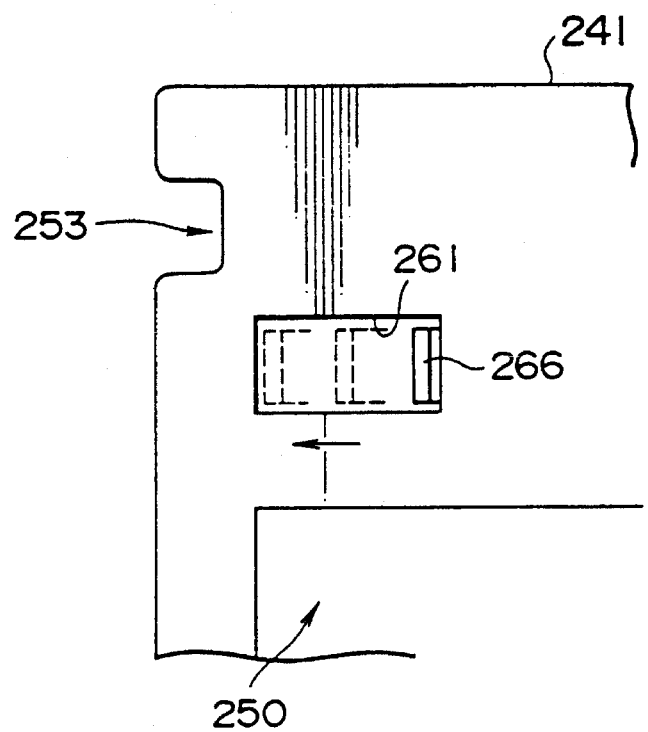
FIG. 9 is a top plan view of the error erasure preventing means shown in FIG. 8.
Figure 10:
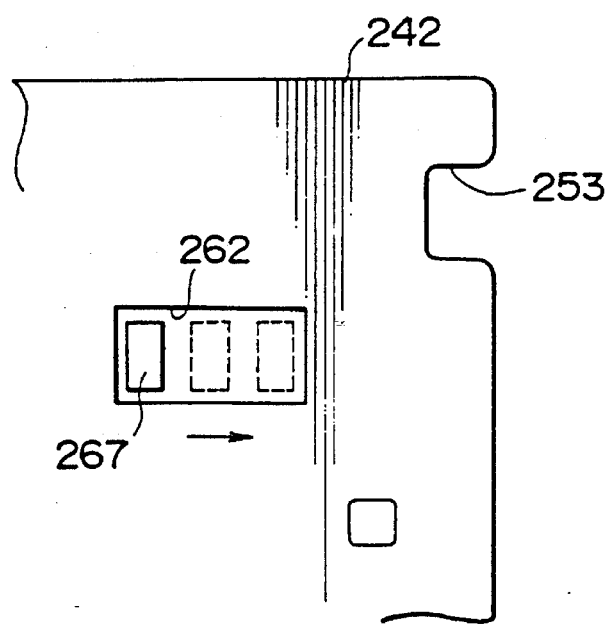
FIG. 10 is a bottom plan view of the error erasure preventing means shown in FIG. 8.

Referring to FIGS. 8 to 10, the error erasure preventing means 260 includes a sliding hole 261 of a predetermined width perforated in the upper case 241, and another sliding hole 262 perforated at a location of the lower case 242 on a little inner side with respect to the sliding hole 261. A guide plate 263 is provided on the upper case 241 such that it extends inwardly so that an error erasure preventing pawl 264 may slidably move along the guide plate 263.

The error erasure preventing pawl 264 has a body 265 having a slide recess 265a conforming to the guide plate 263, and a positioning piece 266 is provided at an upper end of the error erasure preventing pawl 264 such that it extends upwardly while a detection projection 267 is provided at a lower end of the body 265 such that it extends downwardly. In the arrangement shown, the detection projection 267 is positioned at a location of the case displaced inwardly by a predetermined distance from the positioning piece 266. A position fixing projection 268 is provided to fix the sliding position of the body 265 at one of the three positions, and three recesses 261a are provided at corresponding positions of the upper case 241.

A detecting sensor 270 is mounted on a body base plate 273 on the apparatus body side in an opposing relationship to the sliding hole 262. The detecting sensor 270 includes three detectors 271a to 271c as described below so that the sliding position of the error erasure preventing pawl 264 may be detected in accordance with the contacting condition with the detectors 271a to 271c.

In the position shown in FIG. 8, the positioning piece 266 is at such a position as shown in FIG. 9 as viewed from the front face side of the disk 300 while the detection projection 267 is at the position of FIG. 10 then as viewed from the rear face side of the disk 300. This position is the first mode position. The position after the positioning piece 266 is moved by one step distance in the rightward direction in FIG. 9 is the second mode position, and when the positioning piece 266 is moved by another one step distance in the rightward direction, the third mode position is reached.

A detection output of the detecting sensor 270 shown in FIG. 8 is supplied to the servo CPU 500, by which a recording inhibition signal is produced in response to the received detection output. In response to the recording inhibition signal, the magnetic head apparatus 230 and the optical pickup apparatus 310 are controlled so as to be put into an error erasure prevention mode corresponding to the switching position.

The area of the magneto-optic film 304 makes the data recording area or program area, and a predetermined area of the program area from the outermost circumferential side to a predetermined inner circumference is assured as the main data area MA while the other predetermined area on the inner circumferential side from the main data area MA is assured as the sub data area SA.

Audio data themselves are recorded in the main data area MA while data incidental to the audio data thus recorded as well as disk control information and some other necessary information are recorded in the sub data area SA. Representative ones of such data recorded in the sub data area SA are illustrated in FIG. 11. Of those data, the disk identification code (disk ID) is an identification code peculiar to the disk. Description of wavelength data will be given hereinbelow.

Figure 12:
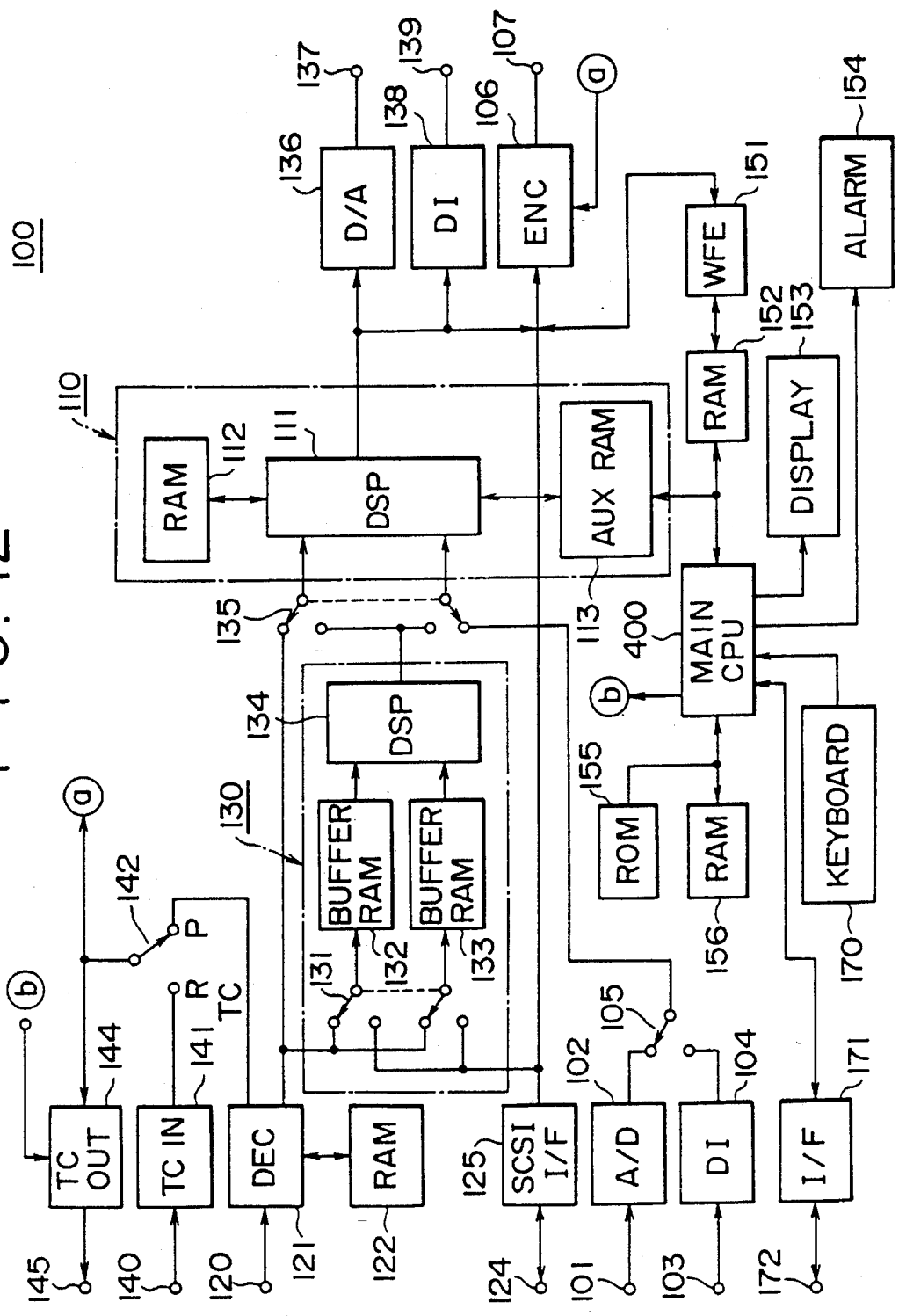
FIG. 12 is a diagrammatic view showing a signal processor used in a disk recording apparatus.

FIG. 12 shows details of the signal processor 100. Referring to FIG. 12, the signal processor 100 has a terminal 101 to which an analog audio signal is inputted. The analog audio signal thus inputted is converted into a digital signal by an analog to digital (A/D) converter 102. A digital audio signal is inputted to another terminal 103 and supplied to a digital interface circuit 104. One of the digital audio signals from the A/D converter 102 and the digital interface circuit 104 is selected by a switch 105 and supplied to a fading control circuit or cross fader 110.

The fading control circuit 110 is a processing system for realizing cross fading such as fade-in or fade-out of an audio signal and includes a digital signal processor (DSP) 111, a temporary RAM 112 for cross fading processing, and a sub data RAM 113 for temporarily storing cross fading processing information.

The digital audio signal processed by such cross fading processing is outputted to an output terminal 107 by way of an encoder 106. The digital audio signal is thus supplied as audio data to the magnetic head apparatus 230.

Audio data read out by means of the optical pickup apparatus 310 are supplied to an input terminal 120 by way of the recording and reproduction processing system 200. The audio data are decoded by a decoder 121 and then processed by error correction processing using a temporary RAM 122. The audio data processed by such processing are supplied to the fading control circuit 110, but upon reproduction of a program, they are supplied also to a fading control circuit 130 for reproduction of a program.

The fading control circuit 130 includes an input changing over switch 131, a pair of batch memories 132 and 133, and a DSP 134. The input changing over switch 131 selects one of an output of the input changing over switch 131 and audio data from another apparatus inputted by way of a terminal 124 and supplied to a SCSI communication interface 125.

The fading control circuit 130 is provided to allow cross fading processing of, for example, random audio data a, b and c on the disk 300 shown in FIG. 13A into a programmed condition as seen in FIG. 13B or 13C. In this instance, a suitable pause period may be inserted between audio data as seen from FIG. 13D. The pause period may be fixed or may be controllable by a user.

Reproduced audio data after cross fading processing are inputted to the fading control circuit 110 by way of a change-over switch 135. In the case of programmed reproduced audio data, the fading control circuit 110 operates to merely pass data therethrough.

An output of the fading control circuit 110 is converted into an analog signal by a digital to analog (D/A) converter 136 and introduced to a terminal 137 or is introduced to another terminal 139 by way of a digital interface circuit 138 while it remains in the form of a digital signal.

A further terminal 140 is an input terminal for inputting a time code TC supplied thereto when necessary. When a time code TC is inputted, it is introduced to an interface circuit 141 and by way of a change-over switch 142 to the encoder 106 so that it is recorded into the main data area MA together with audio data. The time code TC outputted from the decoder 121 is outputted to an external terminal 145 side by way of the change-over switch 142 and an interface circuit 144.

The main CPU 400 executes controlling upon various required signal processing of the signal processor 100 such as cross fading processing as described above, and also a waveform data processing circuit 151 and some other components are controlled by the main CPU 400. The waveform data processing circuit 151 has a waveform editing function and samples audio data at a predetermined distance to accumulate waveform data. A RAM 152 is a temporary RAM used upon such accumulation of the waveform data processing circuit 151. The waveform data accumulated in the RAM 152 are stored into the sub data RAM 113.

FIGS. 14A and 14B illustrate an example of edition of such waveform data. As seen in FIGS. 14A and 14B, a maximum value is detected within a predetermined period T of original audio data, and such maximum values are accumulated until after recording is ended and are recorded as waveform data into the sub data area SA.

By observing the waveform data continuously, it can be roughly grasped what audio data are recorded. This can be displayed on a display section 153. The waveform data may be displayed by reading them out from the sub data RAM 113 after recording audio data and supplying them to the display section 153 so as to be displayed on the display section 153. Further, since the waveform data can be reproduced any time from the sub data area SA of the disk 300, the reproduced waveform data can be stored in the sub data RAM 113 and then supplied to the display section 153 so that they can be displayed at any time.

Such a level displaying section as shown in FIG. 15 is provided at a portion of the display section 153. The level displaying section 180 is constructed so as to display a level for two channels, and for each channel, the level displaying section 180 includes a plurality of, display elements 181 arranged in a line 24 in the arrangement shown. An additional display element 182 for displaying an over level is provided for each channel.

The reason why a total of 24 display elements 181 are provided is that it is intended to allow the level displaying section 180 to display a level even with a maximum quantization bit number of input audio data. This is because, since three different sampling frequencies (48 KHz, 44.1 KHz and 44.056 KHz) are prepared as a sampling frequency to be used for sampling, the quantization bit number varies among 24 bits, 20 bits and 16 bits depending upon the sampling frequency actually used.

The relationship between the display elements 181 and the bits is determined such that a leftmost end one of them represents the MSB and a lower bit is displayed toward the right in FIG. 15. The sixteenth indicating element represents the LSB when the quantization bit number is 16. Similarly, the twentieth indicating element represents the LSB when the quantization bit number is 20, and the twenty fourth indicating element represents the LSB when the quantization bit number is 24.

A display element driving circuit 185 for performing such bit displaying operation as described above is provided in the display section 153 and has such a construction as shown in FIG. 16.

Referring to FIG. 16, waveform data inputted to a terminal 186 from the sub data RAM 113 by way of the main CPU 400 are supplied to a shift register 187 of the 8-stage construction and are thereafter shifted one by one bit in response to a shift clock (bit clock) received from another terminal 190. The shift register 187 is connected in cascade connection to two other shift registers 188 and 189, and a first input bit to the shift register 187 makes the LSB while a last input bit makes the MSB. Bit outputs of the shift registers register 187, 188 and 189 are latched simultaneously by latch circuits 191, 192 and 193 and then supplied to corresponding display elements 181 by way of drivers 194, 195 and 196, respectively.

With the construction just described, such a bit display corresponding to an input bit number as seen from FIGS. 15A and 15B can be realized. Further, such waveform data as described above may be outputted also to an external apparatus.

Referring back to FIG. 12, the signal processor 100 will be described. Alarming means 154 is connected to the main CPU 400 and gives a warning to a user when a data error occurs due to adhesion of dust or some other foreign article upon checking of a disk which will be hereinafter described. Details of the alarming means 154 will be hereinafter described.

A control program and some other programs necessary for execution of signal processing are stored in a ROM 155, and sub data information and other information stored temporarily in the sub data RAM 113 provided in the fading control circuit 110 are finally stored into a RAM 156.

The signal processor 100 further includes a keyboard 170 which is manually operated by a user and serves as an interface which is used when communications with the servo CPU 500 should be performed.

Figure 17:
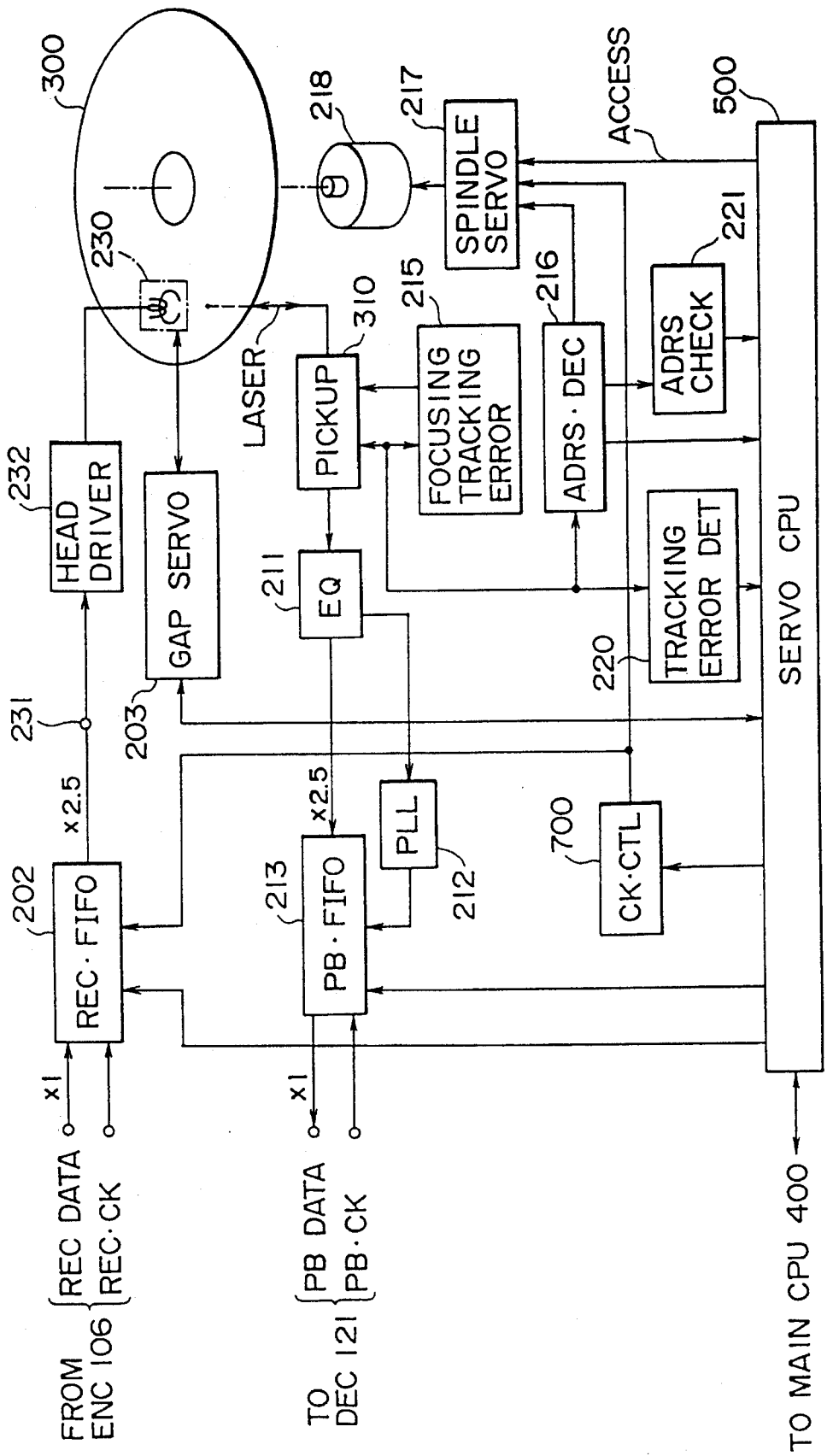
FIG. 17 is a block diagram showing a recording and reproduction processing section used in the disk recording apparatus.

FIG. 17 shows details of the recording and reproduction processing system 200. Referring to FIG. 17, audio data outputted from the encoder 106 are supplied to a buffer memory 202 of the FIFO (first-in first-out) construction, and after audio data of a predetermined number of blocks are stored into the buffer memory 202, the audio data are read out from the buffer memory 202 at a rate higher than the rate at which the audio data are written into the buffer memory 202. The reading rate is set equal to or higher than approximately 2.5 times the writing rate. The writing rate is adjusted by the speed of rotation of the disk. In the arrangement shown in FIG. 12, the reading rate is set equal to 2.5 times the writing rate. In other words, the speed of rotation of the disk is set to 2.5 times an ordinary speed of rotation. The reason why the disk 300 is accessed at such a high rate is that it is intended to realize recording monitoring using a single pickup system as hereinafter described.

Audio data read out at the 2.5 times rate are supplied by way of the head driver 232 to and recorded by the magnetic head apparatus 230. A gap circuit 203 is provided to control the gap length of the magnetic head apparatus 230 to a fixed length.

Audio data recorded on the disk 300 are read out (reproduced) by the optical pickup apparatus 310. The reading rate is the 2.5 times rate, which is equal to the writing rate. The waveform of the reproduction output is shaped by an equalizer circuit 211, and an absolute address included in the reproduction output is supplied to a PLL (phase-locked loop) 212 to produce a reproduction clock.

The reproduction output data shaped by waveform shaping with reference to the reproduction clock are supplied to and stored into a buffer memory 213 of the FIFO type. The rate at which data are read out from the buffer memory 213 is the one time rate, which is equal to the normal writing rate for the disk, and the data thus read out are supplied to the decoder 121.

The reason why audio data are written onto and read out from the disk 300 at a rate equal to at least 2.5 times the transfer rate of audio data outputted from the signal processor 100, but the audio data are supplied back to the signal processor 100 at the original one time rate is that it is intended to realize recording monitoring with a single laser beam.

Figure 19:
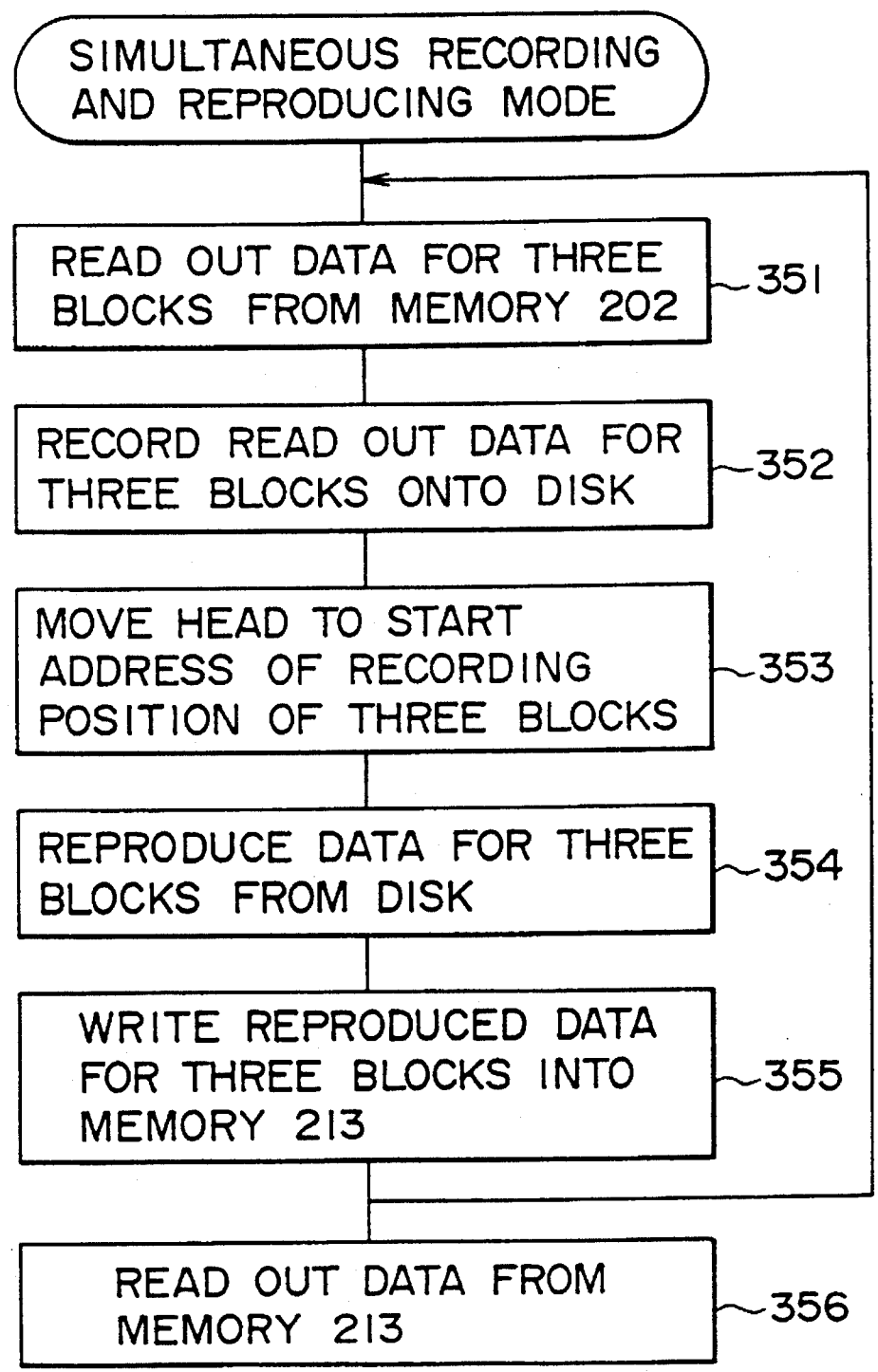
FIG. 19 is a flow chart of operation in a simultaneous recording and monitoring mode.

Such recording monitoring will be described subsequently with reference to FIGS. 18 and 19.

When the writing rate of audio data onto the disk 300 is the 2.5 times rate, a read mode is started at a time at which audio data for three blocks are stored into the buffer memory 202 (step 351). The relationship between the time base of original audio data and the time base of audio data read out from the buffer memory 202 is such as seen from FIGS. 18A and 18B, and within a time for more than one block of original audio data, writing of audio data for three blocks onto the disk 300 is completed (step 352).

After such writing is completed, the optical pickup apparatus 310 is moved at a high speed (high speed seek) to a start address of audio data having been recorded last (step 353), and thereafter, the optical pickup apparatus 310 enters into a read mode immediately (step 354). Since the reading rate also is the 2.5 times rate which is equal to the writing rate, reading out of the audio data for three blocks is completed within a time equal to the writing time (FIG. 18C). The audio data thus read out are simultaneously written into the buffer memory 213 (step 355).

Since the sum of the writing time of audio data onto the disk and the reading time of the audio data from the disk is shorter than the time for original data for three blocks, when reading out of the audio data is completed as seen in FIG. 18B, the optical pickup apparatus 310 is immediately moved to rear end data of audio data written last to make preparations for writing processing for next audio data (4th to 6th blocks) (step 352).

On the other hand, since audio data are read out from the buffer memory 213 after the time base is returned to the original time base (step 356), audio data having been written last can be monitored simultaneously upon writing processing of next audio data as seen from FIG. 18D.

Figure 20:
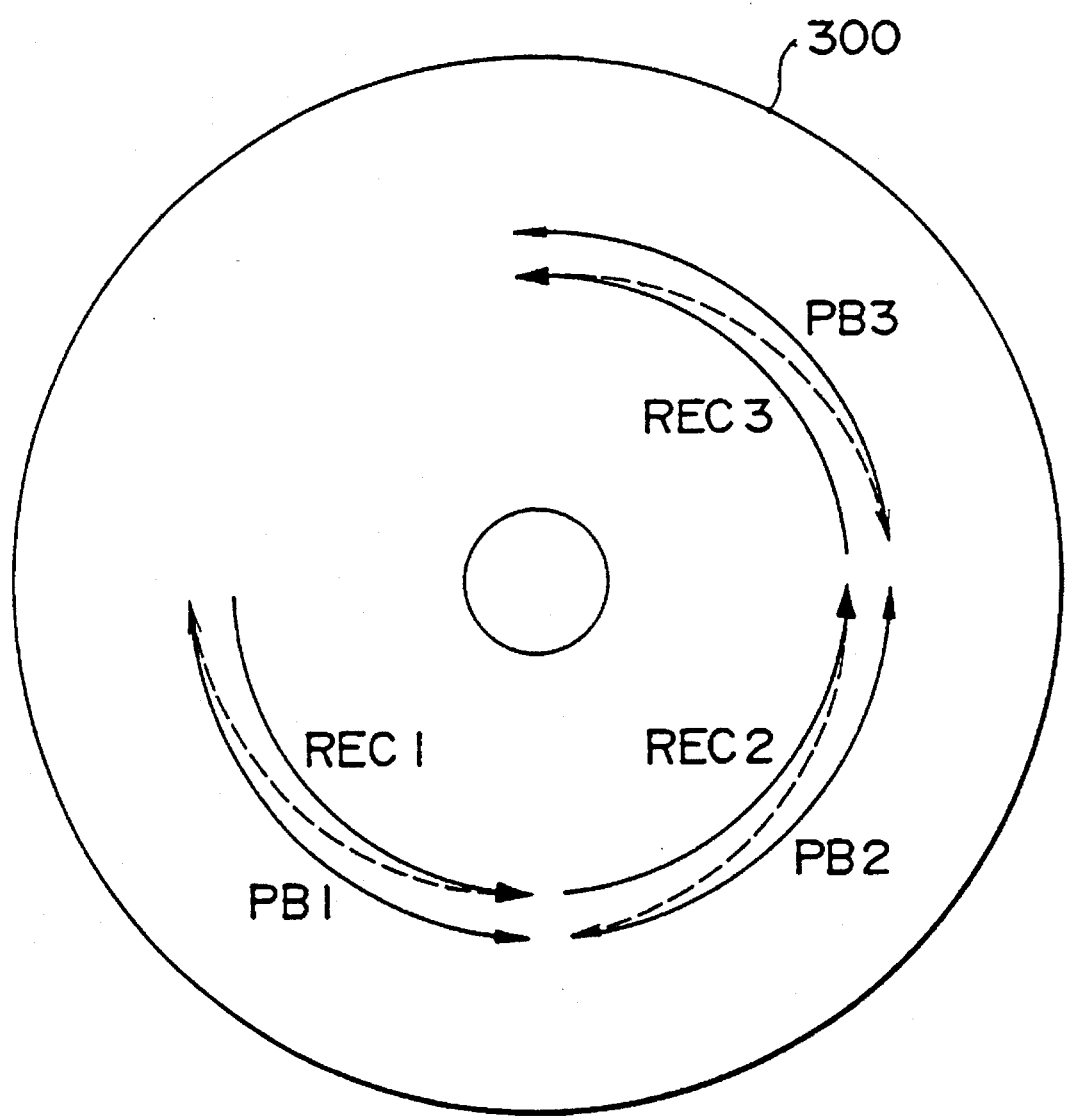
FIG. 20 is a diagrammatic view illustrating a recording monitoring operation on a disk.
Figure 23:
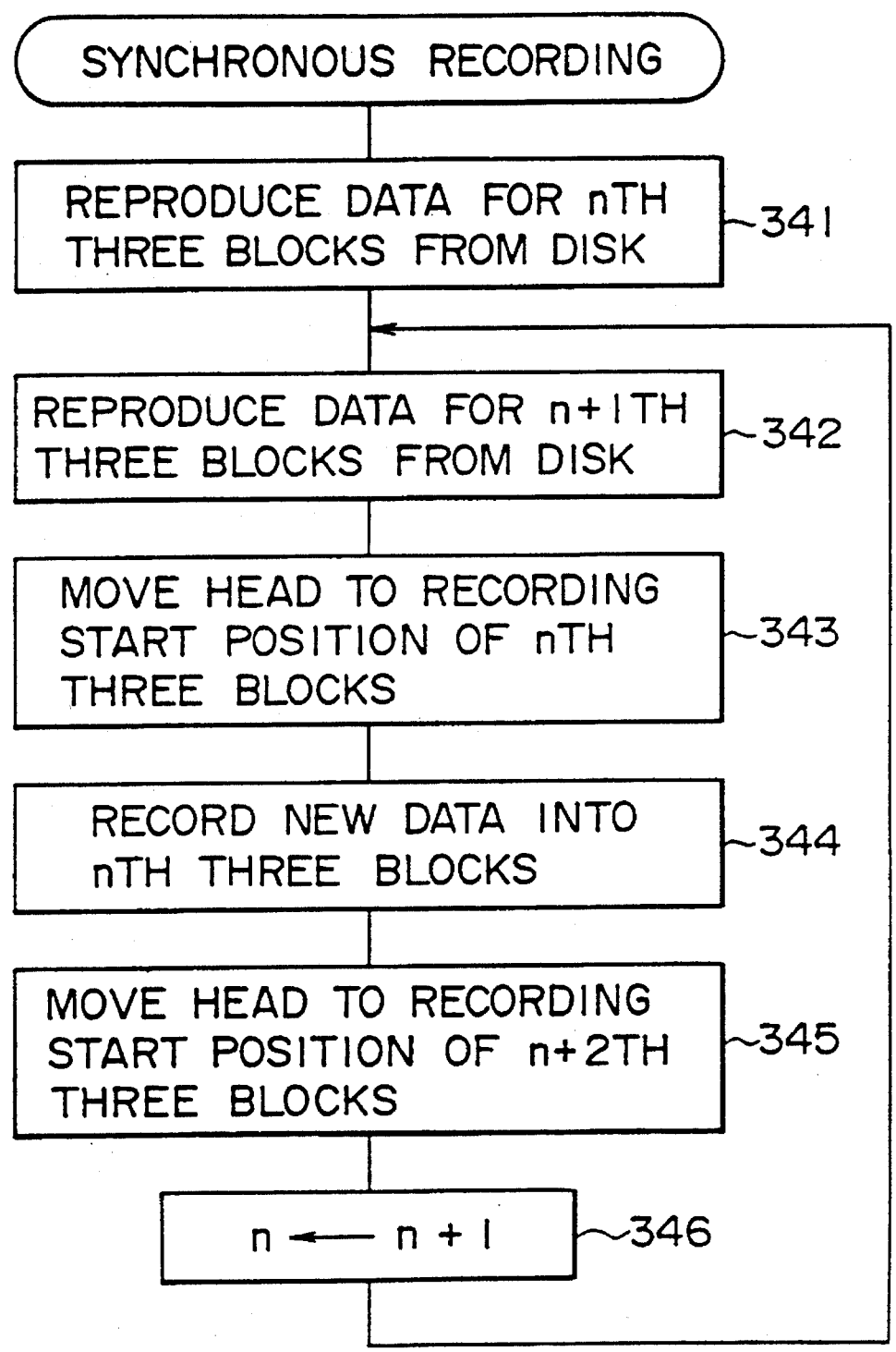
FIG. 23 is a flow chart illustrating synchronous recording.

FIG. 20 illustrates the concept described above. As seen from FIG. 20, writing processing and reading out processing of audio data onto and from the disk 300 are performed repetitively in a paired condition, and consequently, a writing operation and a recording monitoring operation of audio data take place in a parallel relationship.

Referring back to FIG. 17 again, the recording and reproduction processing system 200 will be described below.

Not only a signal component but also a tracking signal and a focusing signal are detected from the optical pickup apparatus 310 and supplied to a focusing and tracking error detecting circuit 215, by which a tracking error and a focusing error are detected independently of each other. The error signals are fed back to a tracking control circuit (not shown) and a focusing circuit (not shown) provided in the optical pickup apparatus 310 so that they may be reduced to zero.

The tracking signal is supplied also to an absolute address detecting circuit 216. Since an absolute address is wobbled, the brightness of laser light reflected by the disk is modulated with the absolute address. An absolute address is detected from the modulation output of the absolute address detecting circuit 216. Since the absolute address is also a signal of the speed of rotation of the disk 300, a servo circuit 217 of a spindle motor 218 is controlled in response to the absolute address so that the speed of rotation of the disk (for example, a circumferential linear velocity CLV) may be fixed.

The absolute address is supplied to the main CPU 400 by way of the servo CPU 500 and converted into a time code TC such as an SMPTE. The absolute address is supplied also to an address checking circuit 221, in which it is used as discrimination data for disk error checking described below.

Disk error checking is performed in order to prevent such a trouble that an error occurs upon writing of data or data cannot be read out correctly due to dust or some other foreign article sticking to the disk during use. For such disk error checking, also a tracking error must be detected. Component 220 is a tracking error detecting circuit of the type just mentioned, and an output of the tracking error detecting circuit 220 is supplied to the servo CPU 500. Details of the disk error checking will be hereinafter described.

A variable oscillation circuit 700 is used as a clock generating circuit. A clock signal from the variable oscillation circuit 700 is supplied as a reference signal to the buffer memory 202 and the servo circuit 217 of the recording system. Since the frequency of the clock signal used is different depending upon the quantization bit number of audio data and further since edition of audio data must be performed while variable speed reproduction is performed, the variable oscillation circuit 700 is constructed in such a manner as shown in FIG. 21.

A reference quartz oscillator 701 serves as an oscillation source, and a quartz oscillator which has a stable oscillation output is used as the reference quartz oscillator 701. The reference oscillation output of the reference quartz oscillator 701 is divided by 1/n (n is an integral number) by a frequency divider 702, and a division output of the frequency divider 702 is supplied to a phase comparator 703. An output of a variable oscillator (VCO) 704 of the voltage controlled type or some other suitable type is used as a clock signal by way of a switch 707 and is also supplied to a variable frequency divider 705, by which it is divided at a dividing ratio designated by the servo CPU 500.

The division output of the variable frequency divider 705 is compared in phase with the reference division output of the frequency divider 702 by the phase comparator 703, and an output of the phase comparator 703 is supplied by way of a low-pass filter 706 to the VCO 704 so that the VCO 704 is controlled such that it may oscillate with a clock frequency set by the servo CPU 500.

Also an oscillation output of the upper case 241 is supplied to the switch 707, and when the VCO 704 is controlled so that it provides a reference oscillation output (f0'=f0), the switch 707 is switched so that the oscillation output of the reference quartz oscillator 701 may be outputted as a clock signal.

Jitters are produced to some degree by the VCO 704 since the VCO 704 is constituted from an LC circuit or a like circuit. Such jitters result in deterioration of the quality of reproduced sound. The reference quartz oscillator 701 produces a much smaller amount of jitters than the VCO 704 since it employs a quartz oscillator or a like element which is high in stability. Accordingly, when the clock signal is controlled to the reference oscillation frequency, reproduced sound of a higher quality is obtained when the oscillation output of the reference quartz oscillator 701 is used, and taking such an instance into consideration, the switch 707 is provided. Since it is controlled by the servo CPU 500 side whether or not the reference oscillation output should be selected, a switch control signal may be provided from the servo CPU 500.

FIGS. 22A to 22C illustrate synchronous recording. Synchronous recording represents synchronous reproduction and synchronous writing (synchronous recording), and a synchronous recording mode is selected when it is desired to re-write part of audio data recorded already on a disk with different audio data or when it is desired to replace part of audio data recorded already on a disk with different data (audio data representative of zero) in order to remove noise mixed in the part of the audio data.

Thus, an operator first performs reading out of audio data from the disk 300 once to confirm what part of data on the disk should be re-written. Then, after a new signal for replacement is prepared, the synchronous recording mode is selected.

Synchronous recording will be described with reference to FIGS. 22A to 22C and 23. First, an Nth block (1 to 3) and an N+1th block (4 to 6) of those blocks to be re-written are reproduced at the 2.5 times rate at such timings as seen from FIG. 21B by means of a pickup 210 (steps 341 and 342). The data thus reproduced are stored into the the buffer memory 213 and then read out at the one time rate from the buffer memory 213 so that they are outputted as a monitor output at such timings as seen in FIG. 21A. After reproduction of the N+1th block (4 to 6) comes to end, the optical pickup apparatus 310 is moved immediately at a high speed to the start position at which the Nth block (1 to 3) is recorded (step 343). The new signal prepared in advance is supplied to the magnetic head apparatus 230 by way of the encoder 106, the buffer memory 202 and the head driver 232 so that it is recorded newly to the position at which the Nth block (1 to 3) has been recorded at such a timing as seen from FIG. 22C. If further re-writing is required, then the optical pickup apparatus 310 is moved to the position at which the N+2th block (7 to 9) is recorded, and reproduces the N+2th block (7 to 9) and outputs it as a monitor output (step 345). Thereafter, the optical pickup apparatus 310 is returned to the recording start position of the preceding block (4 to 6) and further records a new signal. By repeating such a sequence of operations as described above, a new recording signal can be recorded in place of an old recording signal while reproduced sound is monitored.

Since writing and reading out of audio data onto and from the disk 300 are performed using the same clock signal, a synchronous recording operation which involves synchronous reproduction and synchronous writing can be performed only with the single optical pickup apparatus 310.

The new signal for replacement is reproduced by an external reproducing apparatus from a recording medium on which the signal is recorded in advance, and is then supplied to the encoder 106 of the present apparatus. In this instance, the position for replacement and the signal for replacement may be timed using a well known phase modifying function. Or else, the new signal may not be prepared in advance, but a player may play while listening to reproduced monitor sound and audio data thus played may be supplied to the present apparatus so as to be recorded. Further, since originally recorded data are reproduced before re-writing of the data, the original audio data reproduced from the disk 300 may be processed by desired processing such as, for example, processing of varying the sound quality, and the thus processed audio data may be supplied to and recorded by the encoder 106.

Since writing and reading out of audio data onto and from the disk 300 are performed using the same clock signal, a synchronous recording operation including synchronous reproduction and synchronous writing can be performed only with the single optical pickup apparatus 310.

Figure 24A:
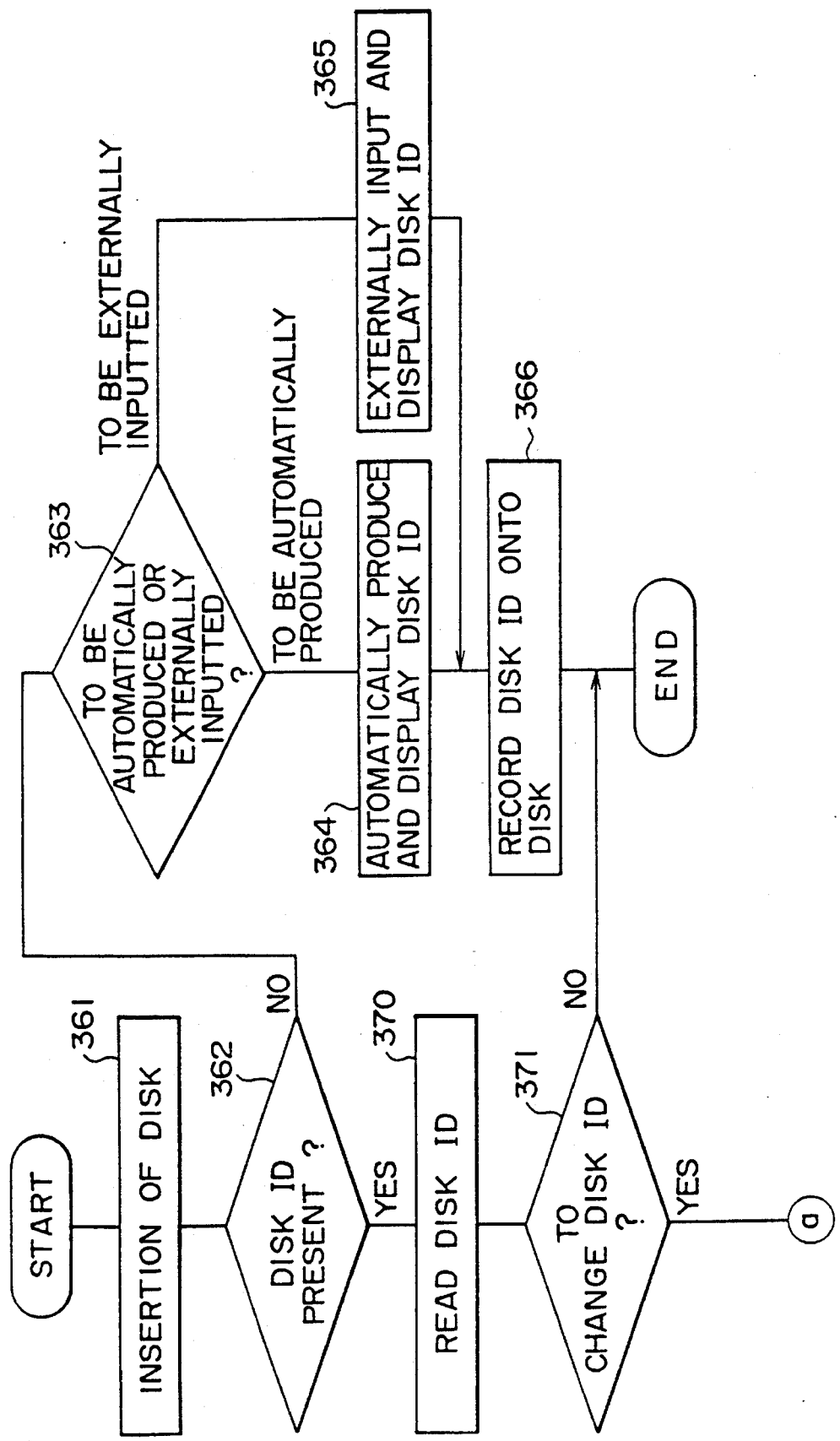

FIG. 24 illustrates an example of registration of a disk identification code (disk ID).

A disk ID is an identification code composed of numerals, symbols or a combination of them and peculiar to the disk and is essentially required in order to control the disk. A disk ID may be, for example, a numeric value of a predetermined number of figures generated in the apparatus body using a table of random digits when the disk is inserted into the apparatus body. However, in order to achieve better control by a user, setting of a numeric code may be committed to control of the user.

Both of them are realized by the routine of the flow chart of FIG. 24. Referring to FIG. 24, when the disk 300 is loaded in position into the apparatus body (step 361), presence or absence of registration of a disk ID is checked (step 362).

Since a disk ID is recorded in the sub data area SA, presence or absence of registration of a disk ID can be checked by retrieving data in the sub data area SA. Data in the sub data area SA are all read once and stored into the RAM 156.

When no disk ID is registered, designation of a registered code is checked (step 363), and when the designation is automatic setting, a peculiar disk ID is designated using the table of random digits and displayed on the display section 153 (step 364).

On the contrary when the designation is external inputting, a numerical value of the predetermined number of figures is inputted by way of the keyboard 170 and is displayed similarly on the display section 153 (step 365). The disk ID thus set automatically or set by external inputting is registered (recorded) into the sub data area SA in accordance with an operation of the user (step 366). Such automatic setting or external inputting is performed in accordance with a key operation.

When a disk ID is registered already on the disk 300, the data of the disk ID are read out (steps 362 and 370), and then a checking mode wherein it is checked whether the registered disk ID should be changed is entered (step 371). When the disk ID should not be changed, the registration processing is completed immediately, but when a key operation to change the disk ID is performed, the same processes as those at the steps beginning with step 363 are executed (steps 372, 373, 374 and 375), whereafter the registration processing is completed.

Writing of a disk ID onto the disk 300 need not necessarily be performed in accordance with a key operation of a user as described above, and a disk ID may otherwise be written by automatic writing processing upon ejection of the disk. In the latter case, the possibility that it is forgotten to write a disk ID and this results in some trouble in later control of the disk is eliminated.

Figure 25A:
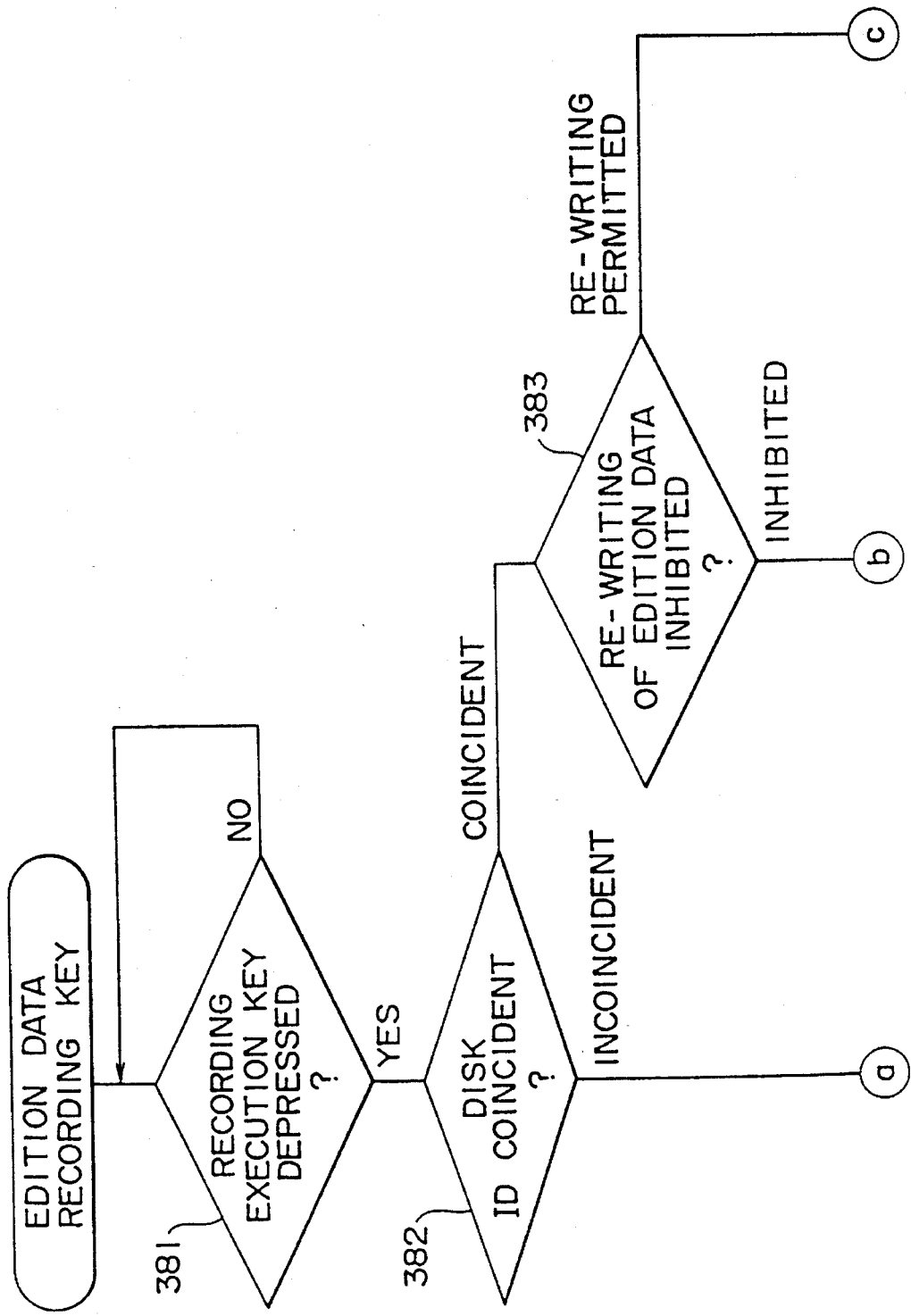
Figure 25B:
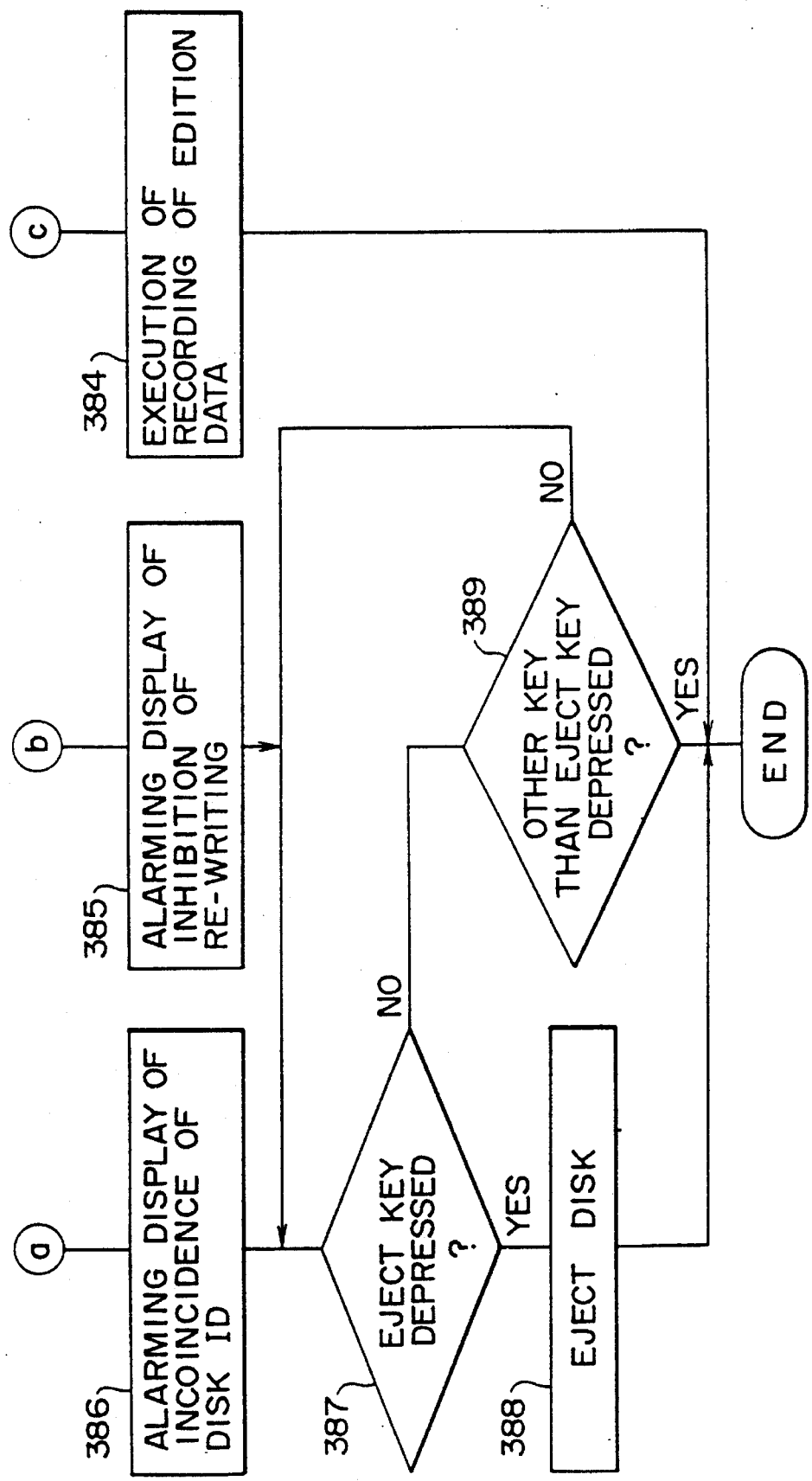

FIG. 25 illustrates processing when a protect mode for protecting various information (hereinafter referred to merely as edition data) incidental to main data and to be recorded into the sub code area SA is adopted.

Various edition data for designating an address of an extraction point of audio data recorded on the disk 300 or for designating cross fading processing are written and registered from the RAM 156 of the apparatus body into the sub data area SA of the disk 300 after completion of an editing operation.

Thereafter, audio data are read out in accordance with the edition data. When the edition data are registered into the sub data area SA, if the disk ID read into the apparatus body and the disk ID of the disk 300 to be recorded are different from each other, such difference should be made known to the operator in order to prevent possible error recording.

FIG. 25 illustrates a procedure for realizing such prevention. Referring to FIG. 25, when an execution key for recording edition data (step 381), the disk ID on the RAM 156 and the disk ID recorded on the disk 300 are compared with each other (step 382), and if they coincide with each other and the positioning piece 266 is not set at the third mode position (step 383), then execution processing for recording the edition data is performed immediately (steps 384).

On the contrary if the error erasure preventing pawl 264 is set at the third mode position, the apparatus is in the protect mode for protecting the sub code area SA, and therefore, even though the disk IDs are coincident with each other, re-writing is inhibited and a warning is given to the user by way of the alarming means (step 385). In this instance, the re-writing inhibition mode may be displayed on the display section 153.

When the two disk IDs are not coincident with each other (step 382), a warning is given to the user by way of the alarming means similarly together with a display of the non-coincidence of the disk IDs (step 386).

After such processing as described above is completed, presence or absence of an operation of the eject key is checked (step 387), and if the eject key is operated, the disk 300 is ejected (step 388). When the eject key is not operated but some other key is operated, the disk 300 is ejected similarly (389), thereby completing the protecting recording processing for the edition data.

The procedure of FIG. 25 described above relates to the protect mode for protecting edition data when the execution key is depressed at an arbitrary timing while an editing operation is continuing.

Figure 26A:
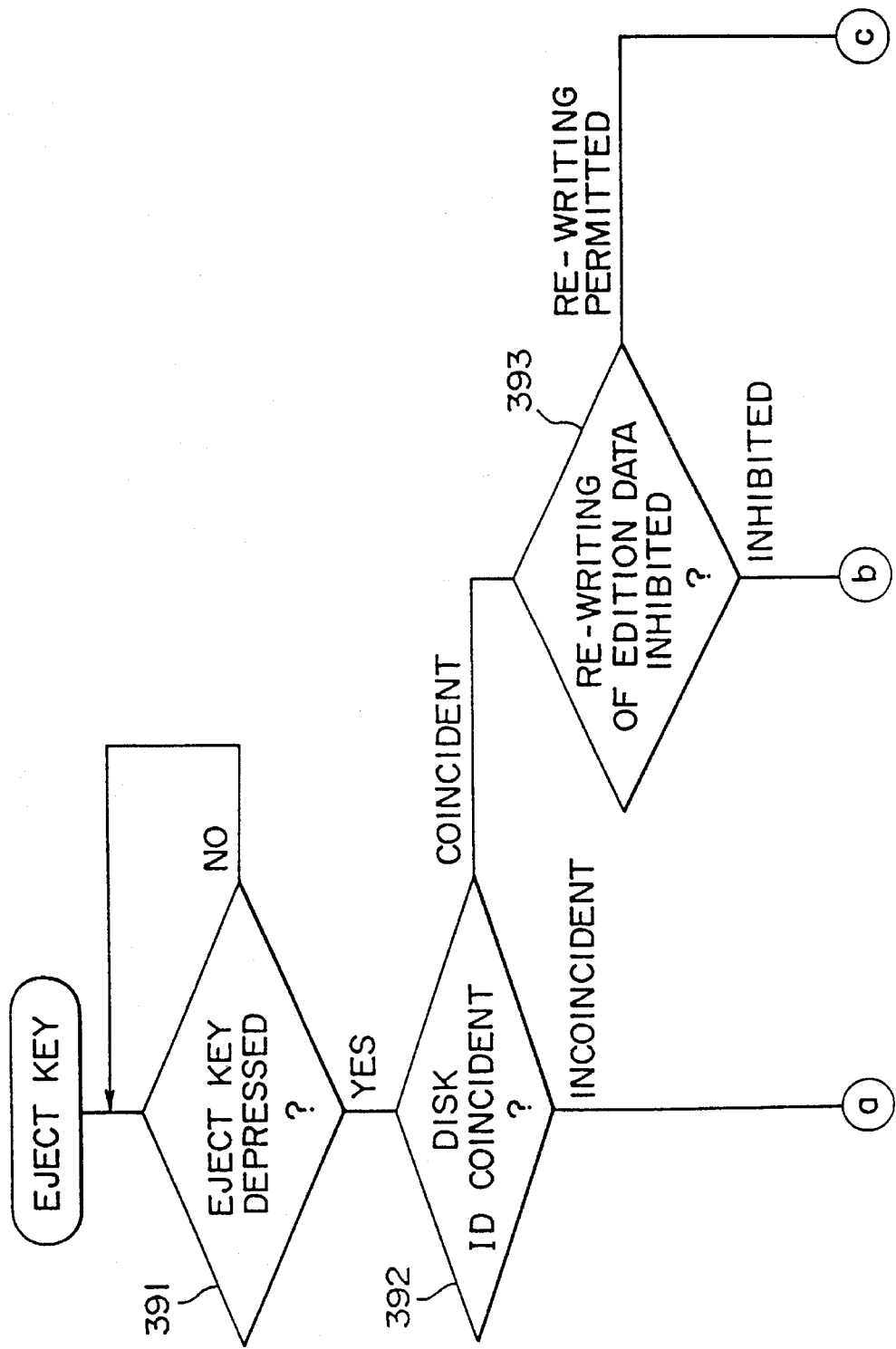

In contrast, FIG. 26 illustrates the procedure in another protect mode for protecting edition data particularly in an eject mode irrespective of presence or absence of an operation of the execution key. The routine of FIG. 26 is different from that of FIG. 25 only in that it does not include a step corresponding to the step 389. This is because the routine of FIG. 26 is a control program which is programmed originally so as to be started only when the eject key is operated. Accordingly, corresponding steps to those of FIG. 25 are denoted by like reference numerals (391 to 398) and overlapping description thereof is omitted herein.

Due to the protecting processing of FIG. 26, edition data are prevented from being recorded onto a disk having nothing to do with the edition data and also from being lost inadvertently.

Figures 27, 28:
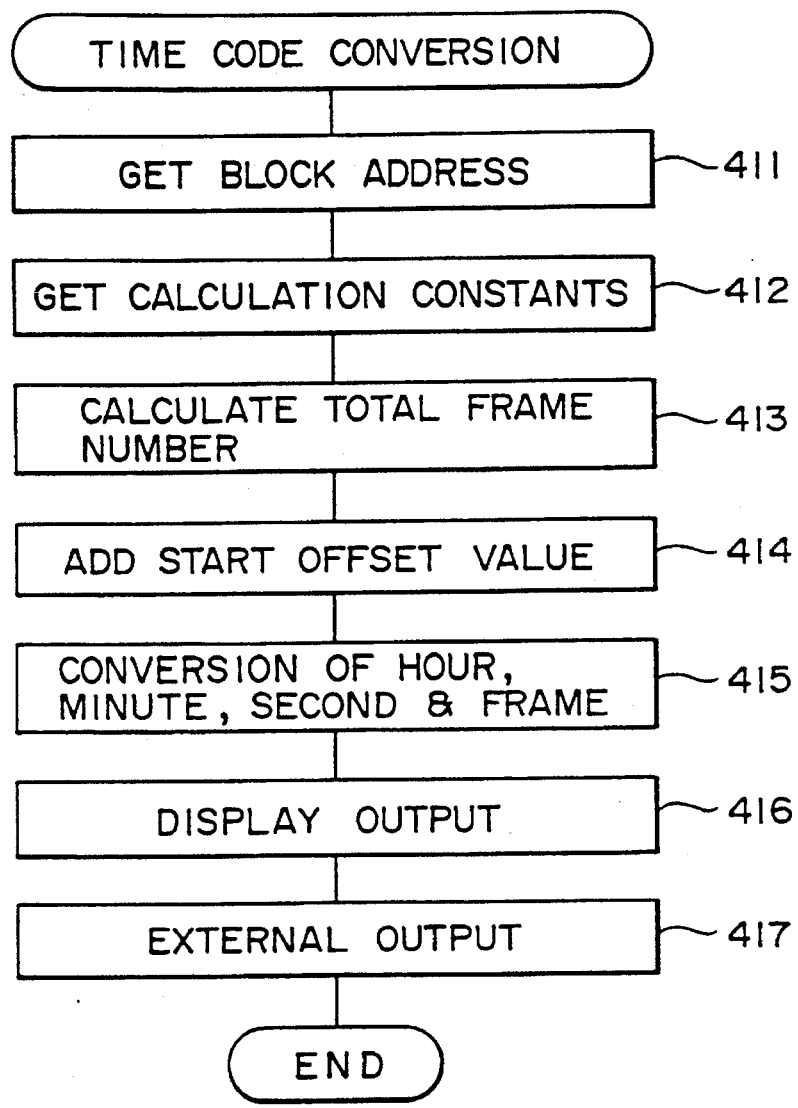

FIG. 27 illustrates a procedure for conversion from an absolute address into a time code. It is more convenient and involves less errors and is further convenient for outputting to an external apparatus to control, upon edition, the time information not in the form of an absolute address but in the form of a time code in units of hour, minute, second and frame.

An absolute address is recorded in an FM modulated condition on the pre-groove 303 on the disk 300 as described above. The absolute address is detected by the absolute address detecting circuit 216 and transmitted to the main CPU 400 by way of the servo CPU 500. The main CPU 400 converts the absolute address into a time code of a designated form in accordance with the flow chart of FIG. 27.

Referring to FIG. 27, an absolute address as a block address is detected first (step 411), and then, constants for conversion processing such as a word length BLKWD and time code format data TCWD are set (step 412).

Since the word length information and the time code format information are both written in the sub data area SA, even if the power supply is interrupted, the information remains on the disk 300, and consequently, no influence is had on the later reproducibility.

The word length BLKWD has a value relying upon the quantization bit number as seen from FIG. 28. The time code format data TCWD have a value which depends upon a time code for conversion and a sampling frequency as seen from FIG. 29, and in the present embodiment, four formats (SMPTE (two formats), EBU and FILM) are available for a time code as seen in FIG. 29.

After such calculation constants are set, a total frame number TCFRM is calculated in accordance with the following equation (step 413):

$$TCFRM = (BLKADR \times BLKWD)/TCWD$$

where BLKADR is a current absolute address, BLKWD is a number of words per one block, and TCWD is a number of words per one time code frame.

Subsequently, a start offset value TCOFST for an absolute address is added to calculate a final total frame number TCACT (step 414).

The total frame number TCACT thus calculated is converted into a time code of hour, minute, second and frame, and the conversion output is displayed and/or outputted externally (steps 415, 416 and 417).

Figure 30A:
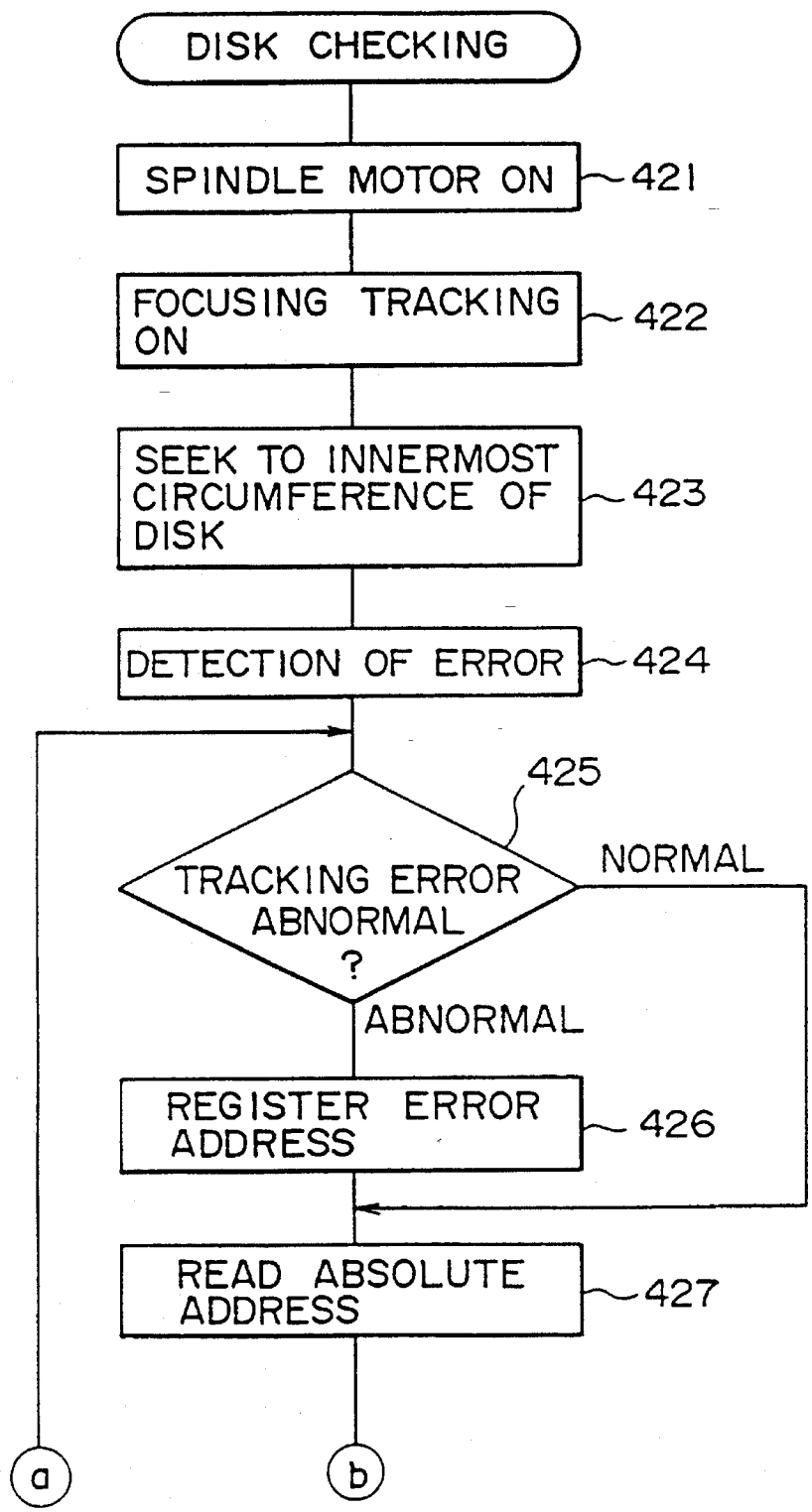
FIGS. 30A and 30B are flow charts illustrating checking of a disk.
Figure 30B:
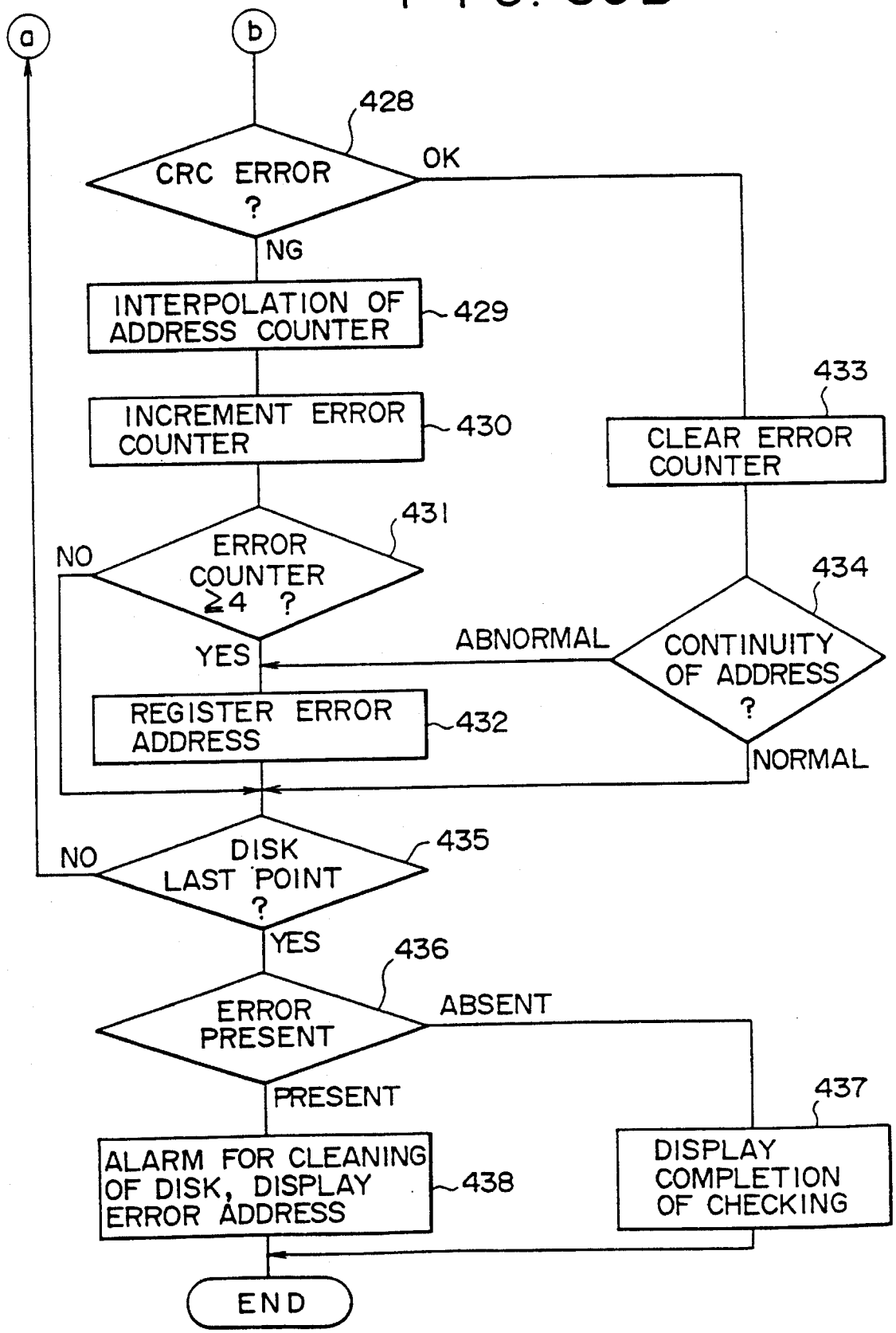

FIG. 30 illustrates a routine of disk error processing. If dust or some other foreign article sticks to the surface of the disk, then a disk error may occur in that data cannot be written onto or read out from the disk.

Referring to FIG. 30, when the disk 300 is inserted in position into the apparatus body, the error checking program illustrated is started. The spindle motor is energized first and then focusing and tracking operations are started, whereafter the optical pickup apparatus 310 is positioned to the innermost circumference of the disk 300, that is, to the top of the main data area MA (steps 421 to 423).

Reading of data is performed in this instance and detection of an error is performed (step 424). Then, if a tracking error is not eliminated even by tracking control by the tracking error detecting circuit 220 shown in FIG. 17, it is determined that the tracking error is abnormal (step 425), and an error address then is registered (step 426).

Subsequently, an absolute address is read in and a CRC error of the absolute address is checked (step 428). A CRC denotes an error correction code, and if a CRC error is present, then the encoder 106 cannot perform error correcting processing accurately, resulting in deterioration of the quality of reproduced sound.

If a CRC error is present, then an address counter (error counter) performs an interpolation operation so that the count value thereof is incremented (steps 429 and 430). Then, when the count value (error count value) is equal to or higher than a prescribed value ("4" in the present embodiment), the absolute value (error address) is registered (steps 431 and 432).

On the contrary when no CRC is present, the error counter is cleared, and then the continuity of the absolute address is checked (steps 433 and 434). When the absolute value is abnormal in continuity, the error address then is registered similarly as described above (step 432). Thereafter, similar checking processing is performed up to the last end of the disk 300 similarly as in a case wherein the absolute address is normal (step 435).

After such error checking up to the outermost circumference of the disk 300 is completed, presence or absence of an error is determined, and when no error is determined, completion of error checking is displayed, but when an error has been detected, the disk 300 will be cleaned and simultaneously the alarm is activated or the error address is displayed, thereby completing the error checking processing (steps 436 to 438).

Figure 31:
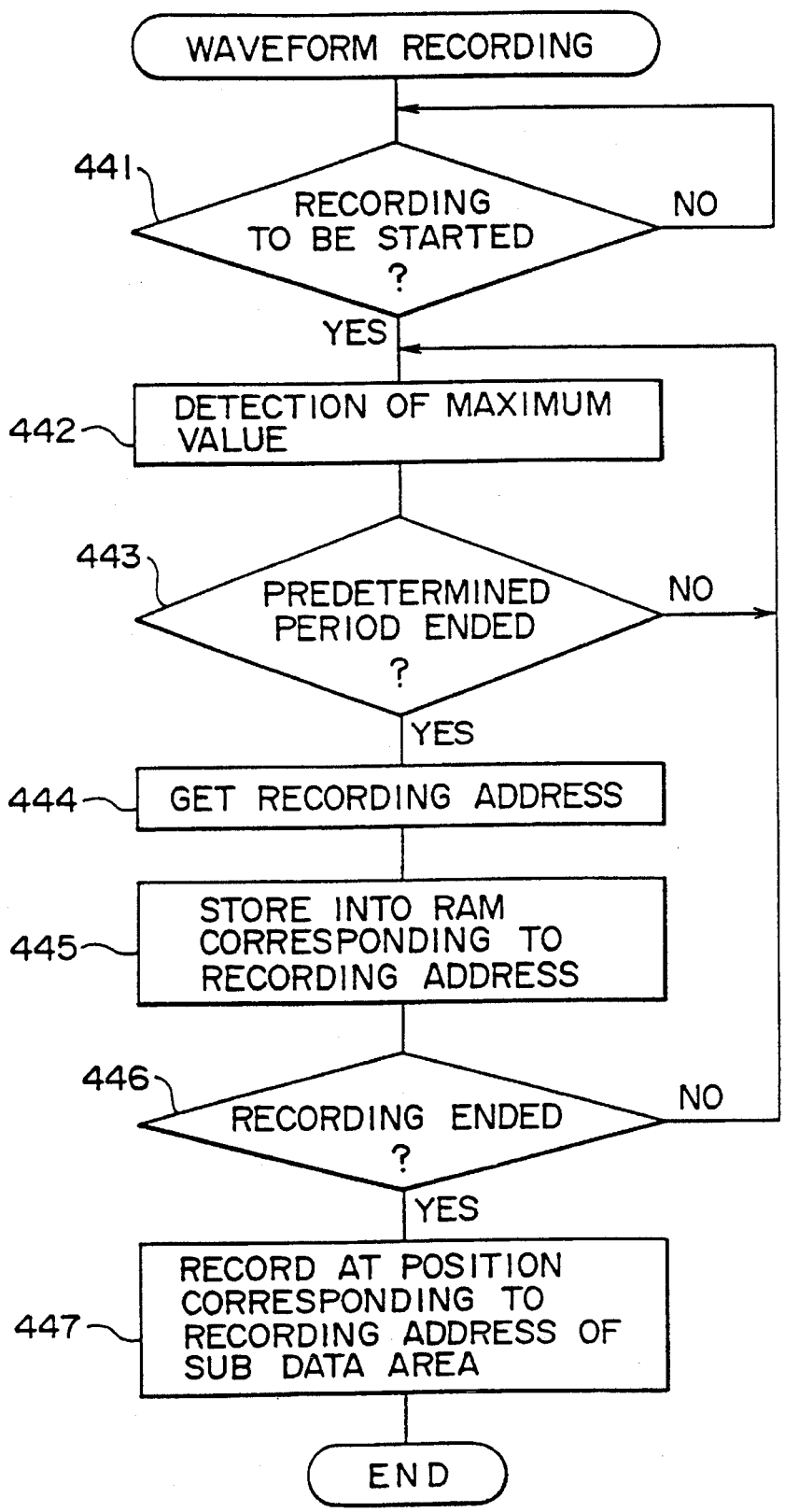
FIG. 31 is a flow chart illustrating recording of waveform data.

FIG. 31 shows a routine of processing which is used upon recording of waveform data.

Referring to FIG. 31, sampling for recording waveform data is started simultaneously with starting of recording of audio data (step 441), and a maximum value max of audio data within a predetermined period T (refer to FIG. 14) is detected (steps 442 and 443). A recording address of audio data corresponding to the thus detected maximum value is detected, and the maximum value of the audio data is stored into the RAM 152 corresponding to the recording address (steps 444 and 445).

Such processing of detection of a maximum value and storage of the thus detected maximum value into the RAM 152 is executed repetitively until recording of the audio data is completed (step 446), and the waveform data stored in the RAM 152 are stored into the sub data RAM 113. Then, when the recording is completed, the waveform data are sent to the recording and reproduction processing system 200 by way of the encoder 106 and are recorded at a predetermined position of the sub data area SA of the disk 300 corresponding to the recording address by the magnetic head apparatus 230 (step 447), thereby completing the waveform data recording processing.

If the predetermined period t in the waveform data recording processing described above is set, for example, to 0.1 second, then the audio data can be compressed sufficiently, and by successively reproducing the waveform data, a rough waveform envelope of the waveform can be detected. This is very convenient since it can be utilized for grasping of a waveform upon edition.

Figures 32A, 32B:
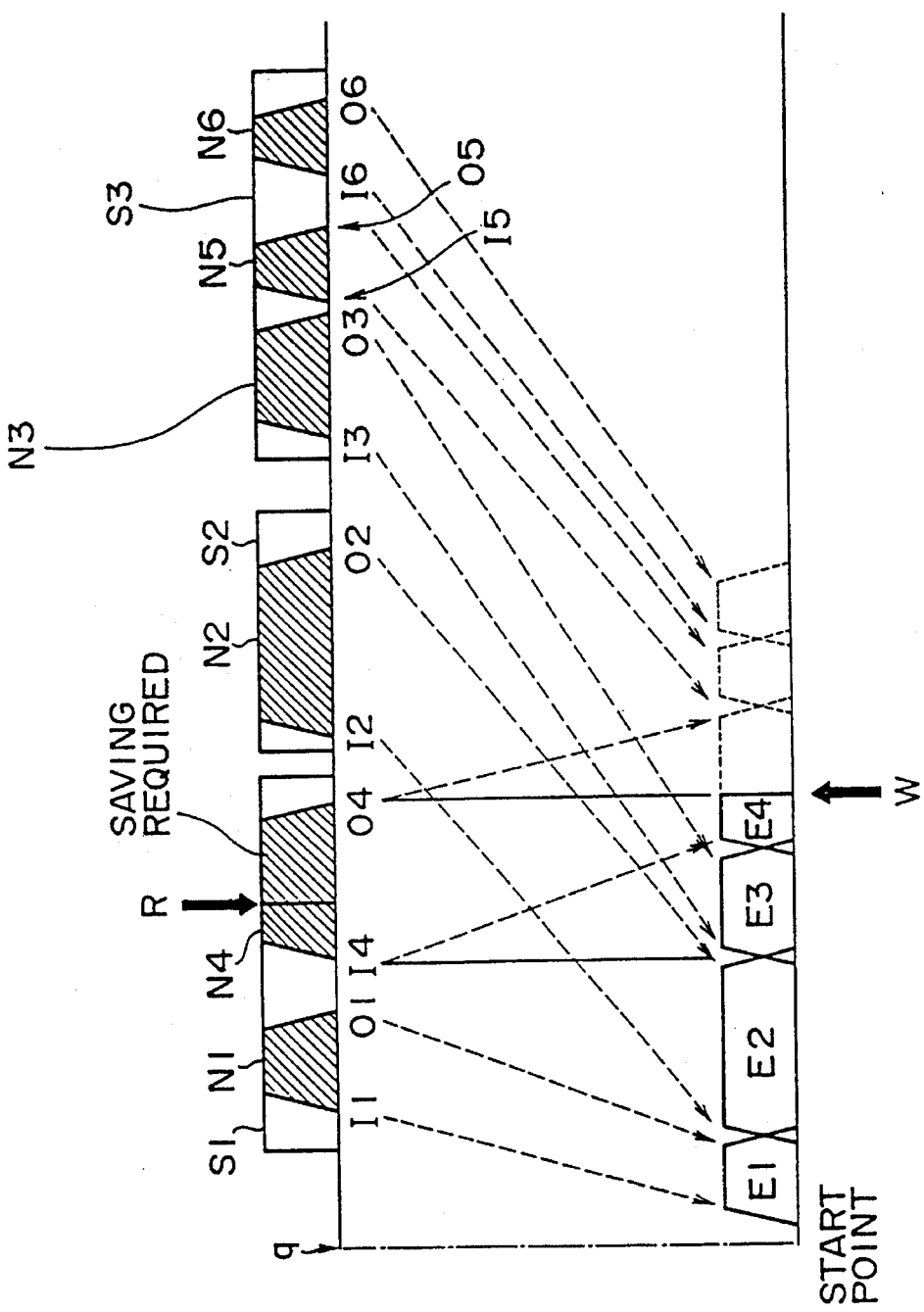
FIGS. 32A and 32B are diagrams illustrating optimization processing of recording data.

FIGS. 32A and 32B illustrate data recording optimization processing for utilizing a recordable area of a disk effectively.

Upon edition of audio data, edition is not always performed using all of audio data recorded on a disk, and normally, audio data are recorded by a little greater amount and a necessary take is extracted from the audio data. Therefore, the amount of originally recorded audio data is much greater than the amount of audio data after edition.

In order to allow effective utilization of the main data area MA into which audio data can be recorded, an area of those audio data which have been rendered unnecessary as a result of edition should be put into an empty region so that new audio data can be recorded into the empty region.

Such processing as described just above will be hereinafter referred to as optimization processing. In optimization processing, it must necessarily be checked in advance to detect whether or not audio data which have not been used for an editing operation are still present in the data recording area before optimization in preparation for recording of data after optimization since the data recording area before optimization is used also as the data recording area after optimization. Otherwise, there is the possibility that audio data after optimization may be overwritten on the recording area of non-used audio data which should be used for later optimization.

Referring first to FIG. 32A, audio data before optimization processing are denoted by Si (i is 1, 2, ..., this similarly applies to the following description), and audio data (material data) for extraction to be used upon edition are data in data areas Ni indicated by slanting lines. Further, Ii denote extraction start points, and Oi denote extraction end points. The material data Ni are edited in order from the lowest value of i.

Referring now to FIG. 32B, Ei denote edition data pointers (edition points), and the start points and the end points of the edition points Ei and the material data Ni have such a relationship as seen in FIG. 33. Referring to FIGS. 32A and 32B, W denotes a pointer for a recording point which represents a data writing pointer at an edition point E when optimization processing is performed. In contrast, R denotes a reading out pointer for the material data Ni before optimization.

Since the material data Ni after optimization are successively overwritten on the audio data Si which have not been optimized, when the start point of the edition point E1 of the material data N1 before optimization is a point q before optimization, even if the material data are read out and overwritten on the audio data S1, the material data N1 will not be destroyed.

This similarly applies to another edition point E2. However, when the material data N3 are to be recorded, they must be overwritten on the material data N4 (which have not been used for optimization processing as yet) on the audio data N1. In this instance, the material data N4 should be saved once, and then the material data N3 should be overwritten on the material data N4. After the material data N3 are overwritten, the material data N4 saved once are overwritten on the audio data S1.

Optimization processing is thereafter performed up to the last edition point while material data to be saved are processed by saving processing. After the optimization processing is completed, a greater empty area is present on the disk 300 as seen in FIG. 32B, and consequently, the disk 300 can be utilized effectively.

Figure 34:
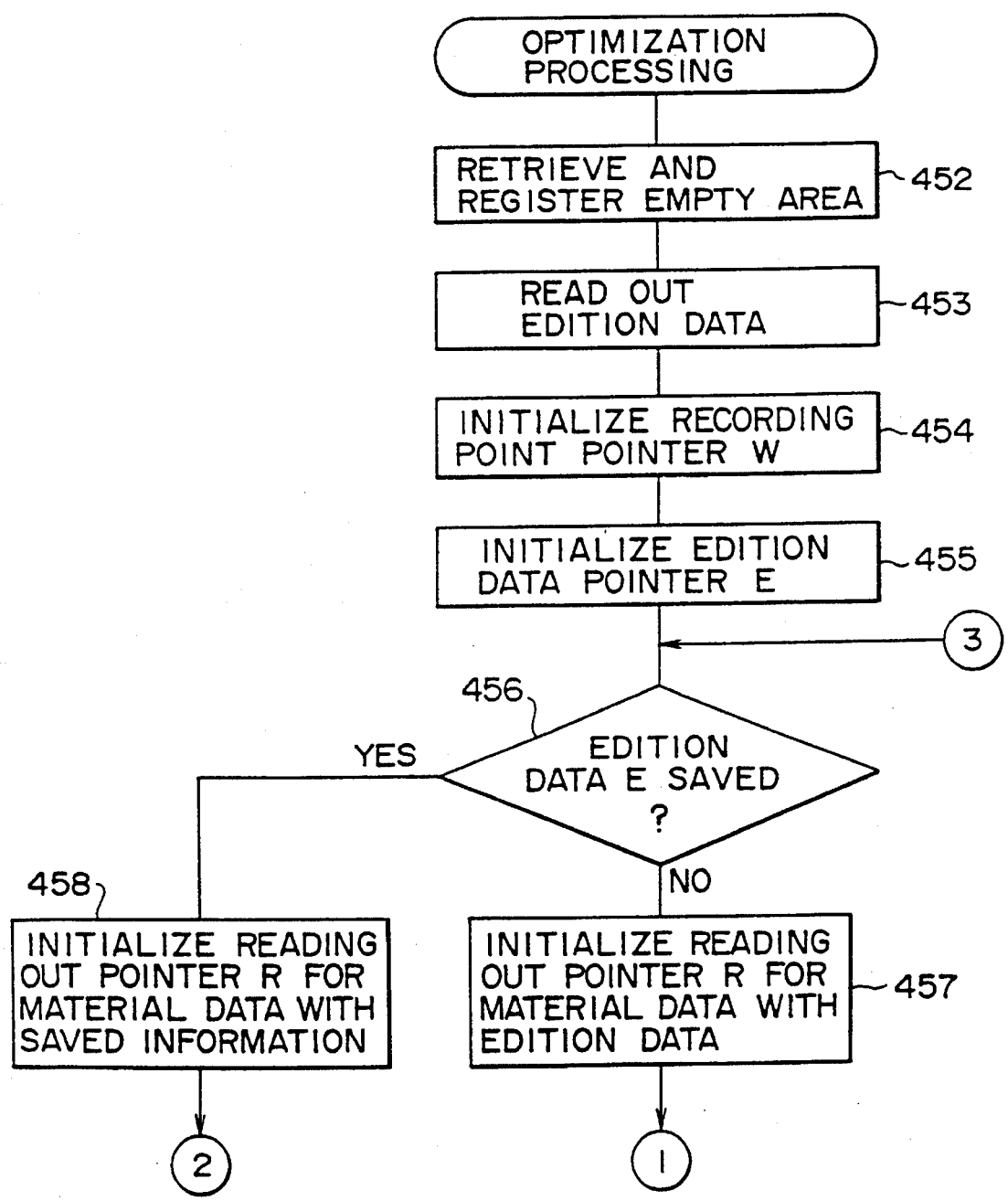

Such optimization processing as illustrated in FIGS. 34 and 35 is executed taking saving processing and some other necessary processing into consideration. It is to be noted that the processing illustrated in FIG. 35 follows the processing illustrated in FIG. 34.

Referring to FIGS. 34 and 35, since recorded data in the sub data area SA are all stored once into the RAM 113 or 156 (the RAM 156 is used in the present embodiment), data on the RAM 156 are retrieved while empty areas and edition data are read out and stored into the RAM 156 again (steps 452 and 453). Then, initialization of the recording point pointer W and the edition data pointer E is executed (steps 454 and 455).

The following description will proceed in connection with individual steps with reference to FIGS. 32A, 32B and 33.

After the initialization is completed, it is checked whether or not the edition data E (E1) have been saved (steps 456). Since the edition data E1 have not been saved as yet, the control sequence advances to step 457, at which the reading out pointer R for the material data N is initialized with the edition data E. In this instance, the initialization is performed such that the reading out pointer R comes to a top address of the edition data E1.

Thereafter, it is checked whether audio data of a predetermined length from the recording point pointer W should be used as later edition data (step 460). Since material data before optimization corresponding to the edition data E are not present, the audio data from the reading out pointer R are written by the predetermined length from the recording point pointer W (step 461).

The predetermined length of audio data is a data length which depends upon, for example, the capacity of the temporary RAM 113 or some other parameter, and audio data of the predetermined length may be either an aggregate of audio data (constituted from a single take or a plurality of takes) or audio data shorter than the length of such aggregate.

Subsequently, it is checked whether or not audio data of the reading out pointer R are still present (step 463), and if such audio data are present, since this does not mean completion of the one edition data E1, both of the recording point pointer W and the reading out pointer R are updated individually, that is, shifted to next positions spaced by the predetermined length, and then similar writing processing is performed (steps 465 and 466).

After overwriting of audio data is performed until after no data of the reading out pointer R are present any more (step 463), a data area of the reading out pointer R is registered as an empty area (step 464). In short, the area of the material data N1 of the audio data S1 makes an empty area. Once the empty area is formed, new audio data can be recorded into the empty area.

After overwriting of the edition data E1 which are one edition data is completed, the edition point E is updated (steps 467 and 468). Consequently, the next edition point now is an edition point E2 (refer to FIG. 33). Since the last position of the edition point E2 overwritten after the optimization does not overlap with the edition start point I4 before optimization, the material data N2 are overwritten into the area of the audio data S1 before optimization through the same steps as the edition data E1. Then, the edition point E is updated to E3.

Even with the edition point E3, no saved data are present (step 456). However, audio data (which correspond to the material data N4) of the predetermined length from the recording point pointer W at the new edition point E3 are used as edition data as apparently seen from FIG. 32, but the audio data have not been used for actual edition.

In this instance, the control sequence advances to step 462, at which the material data N4 from the recording point pointer W are saved into the empty area of the disk 300. Simultaneously, the saved information is registered into the RAM 156.

Then, the material data N3 corresponding to the edition point E3 set at step 457 are overwritten from the recording point pointer W (this is a top address of the edition point E3). After overwriting of the material data N3 for the edition point E3 at the position of the material data N4 before optimization is completed, the edition point E is updated to E4.

Consequently, it is determined at step 456 that the edition data E4 have been saved, and accordingly, the control sequence now advances to step 458, at which the reading out pointer R regarding the material data N4 is initialized using the saved information described above, that is, modified to a start address of the edition point E4. Thereafter, the saved material data N4 are overwritten from the recording point pointer R (step 461).

In this instance, part of the material data N4 for optimization is overlapped with part of the material data N2 in FIGS. 32A and 32B. However, since the data area of the material data N2 is registered already as an empty area (step 464), no trouble occurs with overwriting processing regarding the material data N4.

Such optimization processing as described above is executed successively up to the last edition data while involving saving processing of audio data (step 467), and the optimization processing is completed by completion of the entire edition data.

Having now fully described the invention, it will be apparent to one of ordinary skill in the art that many changes and modifications can be made thereto without departing from the spirit and scope of the invention as set forth herein.

What is claimed is:

1. An apparatus for recording and reproducing signals in data blocks onto and from a disk medium, comprising:

a recording and reproducing head;

first memory means for receiving and storing input signals at a first data transferring rate and supplying the stored signals at a second data transferring rate higher than the first data transferring rate so as to be recorded onto the disk medium at the second data transferring rate by means of said recording and reproducing head;

second memory means for receiving and storing signals reproduced from the disk medium at the second data transferring rate by means of said recording and reproducing head and outputting the signals stored in the second memory at a data transferring rate lower than the second data transferring rate; and control means for controlling said recording and reproducing head to relatively scan a portion of the disk medium corresponding to a predetermined number of blocks twice for a predetermined period of time so that recording and reproduction occur alternately and successively at said portion of the disk medium.

2. An apparatus according to claim 1, wherein the data transferring rate at which said second memory means outputs the stored signals is equal to the first data transferring rate.

3. An apparatus according to claim 1, wherein the second data transferring rate is controlled in accordance with a speed of rotation of the disk medium.

4. An apparatus according to claim 1, wherein each of said first and second memory means comprises a buffer memory of the first-in first-out type.

5. An apparatus according to claim 1, wherein the second data transferring rate is at least about 2.5 times the first data transferring rate.

6. An apparatus according to claim 1, wherein said recording and reproducing head includes an optical pickup and a magnetic head positioned with the disk medium interposed therebetween.

7. An apparatus according to claim 1 wherein said first and second memory means each comprise a first-in first-out type buffer memory.

8. A method of recording and reproducing signals onto and from a disk medium, the signals being supplied to a first memory before being recorded onto the disk medium, comprising the steps of:

receiving and storing in said first memory input signals at a first data transferring rate;

outputting to a recording and reproducing head a predetermined number of blocks of the stored signals from said first memory at a second data transferring rate higher than the first data transferring rate;

recording the output signal blocks from said first memory onto the disk medium by means of said recording and reproducing head;

moving said recording and reproducing head to a starting position of the disk medium at which the predetermined number of blocks are recorded;

reproducing the predetermined number of recorded blocks by means of said recording and reproducing head;

storing the reproduced predetermined number of blocks into a second memory at the second data transferring rate;

repeating all of the steps above until a plurality of sets of predetermined number of blocks are stored into the second memory; and outputting each of the sets of the predetermined number of blocks from said second memory at a data transferring rate lower than the second data transferring rate substantially simultaneously with recording of a subsequent predetermined number of blocks onto the disk medium.

9. A method according to claim 8, wherein the data transferring rate at which said second memory means outputs the stored signals is equal to the first data transferring rate.

10. A method according to claim 8, wherein the second data transferring rate is controlled in accordance with a speed of rotation of the disk medium.

11. A method according to claim 8, wherein each of said first and second memory means comprises a buffer memory of the first-in first-out type.

12. A method according to claim 8, wherein the second data transferring rate is at least about 2.5 times the first data transferring rate.

13. A method according to claim 8, wherein said recording and reproducing head includes an optical pickup and a magnetic head positioned with the disk medium interposed therebetween.

14. An apparatus for recording and reproducing signals onto and from a disk medium, comprising:

a recording and reproducing head;

a first memory coupled to receive and store input signals at a first data transferring rate and supply the stored signals at a second data transferring rate higher than the first data transferring rate to said head for recording onto the disk medium at the second data transferring rate;

second memory means coupled to said head to receive and store signals reproduced from the disk medium by said head at the second data transferring rate and output the signals stored in the second memory at a data transferring rate lower than the second data transferring rate; and control means for controlling said head to alternately (1) record onto a portion of said disk medium at said second data transferring rate a portion of the data stored in said first memory and (2) reproduce to said second memory at said second data transferring rate said data recorded onto said portion of said disk medium.

15. An apparatus according to claim 14 wherein said second data transferring rate is sufficiently faster than said first data transferring rate to allow said head to record and reproduce at said portion of said disk medium in a time period required to store said portion of the signal stored in the first memory.

16. An apparatus according to claim 15 wherein said second data transferring rate is at least about 2.5 times said first data transferring rate.

17. An apparatus according to claim 15 wherein the data transferring rate at which said second memory means outputs the stored signals is equal to the first data transferring rate.

18. An apparatus according to claim 15 wherein a speed of rotation of the disk medium is controlled to provide the second data transferring rate.

19. An apparatus for recording and reproducing signals in data blocks onto and from a disk medium, comprising:

a recording and reproducing head;

first memory means for receiving and storing input signals at a first data transferring rate and supplying the stored signals at a second data transferring rate higher than the first data transferring rate so as to be recorded onto the disk medium at the second data transferring rate by means of said recording and reproducing head;

second memory means for receiving and storing signals reproduced from the disk medium at the second data transferring rate by means of said recording and reproducing head and outputting the signals stored in the second memory means at a data transferring rate lower than the second data transferring rate; and control means for controlling said recording and reproducing head so as to access a start point on the disk medium of a first predetermined number of blocks of the recorded input signals to reproduce the first predetermined number of blocks before a second predetermined number of blocks subsequent to the first predetermined number of blocks are recorded by said recording and reproducing head.

* * * * *